United States Patent [19]
Harris et al.

[11] Patent Number: 5,541,145
[45] Date of Patent: Jul. 30, 1996

[54] LOW TEMPERATURE SINTERING ROUTE FOR ALUMINUM NITRIDE CERAMICS

[75] Inventors: Jonathan H. Harris, Scotsdale, Ariz.; Subhash L. Shinde, Croton-on-Hudson, N.Y.; Takeshi Takamori, Liberty Lake, Wash.; Robert A. Youngman, Paradise Valley, Ariz.; Lester W. Herron, Hopewell Junction; Benjamin V. Fasano, New Windsor, both of N.Y.

[73] Assignee: The Carborundum Company/IBM Corporation

[21] Appl. No.: 489,615

[22] Filed: Jun. 12, 1995

Related U.S. Application Data

[63] Continuation-in-part of Ser. No. 172,032, Dec. 22, 1993, Pat. No. 5,424,261.

[51] Int. Cl.$^6$ ................................................. C04B 35/581
[52] U.S. Cl. ........................... 501/96; 501/98; 501/153; 428/901; 428/698; 428/704
[58] Field of Search ................................. 501/96, 98, 153; 428/698, 704, 901

[56] References Cited

U.S. PATENT DOCUMENTS

| | | | |
|---|---|---|---|
| 4,478,785 | 10/1984 | Huseby et al. | 264/65 |
| 4,520,116 | 5/1985 | Gentilman et al. | 501/98 |

(List continued on next page.)

FOREIGN PATENT DOCUMENTS

| | | |
|---|---|---|
| 62-176961 | 8/1987 | Japan . |
| 3218977 | 1/1990 | Japan . |
| 2275769 | 11/1990 | Japan . |

OTHER PUBLICATIONS

Kurokawa, et al, *Development and Microstructural Characterization of High-Thermal Conductivity Aluminum Nitride Ceramics*, Journal Americal Ceramic Society, 1988, pp. 588–594.

Troczynski et al, *Effect of Additives on the Pressureless Sintering of Aluminum Nitride between 1500° and 1800°C*, Journal of American Ceramic Society (1989) pp. 1488–1491.

Yesaf et al, Development of Aluminum Nitride Ceramics by Pressureless Sintering, pp. 1–11.

Cannell et al, *Processing of Electronic Ceramics*, Advanced Ceramic Processing and Technology, pp. 95–121, 1993.

Bernard Schwartz, *Multilayer Ceramics*, Materials Research Symposium Proc., vol. 40, (1985 Materials Research Society) pp. 49–59.

Sainz De Baranda, P.Ph.D. "The effect of Calcia and Silica on the Thermal Conductivity of Aluminum Nitride Ceramics" Dissertation, Rutgers, The State Univ. of N.J. (1991).

Virkar, Anil V. et al, "Thermodynamic and Kinetic Affects of Oxygen Removal on the Thermal Conductivity of Aluminum Nitride", *J. Am. Ceram. Soc.*, vol. 72 No. 11, pp. 2031–2042 (1989).

Sainz de Baranda, Pedro et al, "Effect of CaO on the Thermal Conductivity of Aluminum Nitride" *J. Am. Ceram. Soc.*, vol. 76 No. 7, pp. 1751–1760 (1993).

Udalov, Y. P. et al, "The Al2O3–CaO–Y2O3 System" *Russian Journal of Inorganic Chemistry*, vol. 24, No. 10, pp. 1549–1552.

Primary Examiner—Melissa Bonner
Attorney, Agent, or Firm—Renner, Kenner, Greive, Bobak, Taylor & Weber

[57] ABSTRACT

An aluminum nitride ceramic having desired properties suitable for electronic packaging applications can be prepared from a novel aluminum nitride powder/sintering aid mixture. The sintering aid comprises a glassy component formed from alumina, calcia and boria, and a non-vitreous component comprising an element or compound of a metal of Group IIa, IIIa, or the lanthanides, preferably crystalline oxides, reactibis with the crystallized glass component and the alumina from the Al N grains. Alternatively, the sintering aid comprises a multi-component glass composition capable of forming the above components upon melting and thereafter crystallizing upon reaction.

60 Claims, 11 Drawing Sheets

RESISTIVITY AND DIHEDRAL ANGLE
AS A FUNCTION OF HEAT TREATMENT

U.S. PATENT DOCUMENTS

| Patent No. | Date | Inventor | Class |
|---|---|---|---|
| 4,533,645 | 8/1985 | Huseby et al. | 501/96 |
| 4,540,673 | 9/1985 | Takeda et al. | 501/96 |
| 4,547,471 | 10/1985 | Huseby et al. | 501/98 |
| 4,569,922 | 2/1986 | Suzuki | 501/89 |
| 4,578,232 | 3/1986 | Huseby et al. | 264/65 |
| 4,578,233 | 3/1986 | Huseby et al. | 264/65 |
| 4,578,234 | 3/1986 | Huseby et al. | 264/65 |
| 4,578,364 | 3/1986 | Huseby et al. | 501/98 |
| 4,578,365 | 3/1986 | Huseby et al. | 501/98 |
| 4,591,537 | 5/1986 | Aldinger et al. | 428/698 |
| 4,615,863 | 10/1986 | Inoue et al. | 419/23 |
| 4,618,592 | 10/1986 | Kuramoto et al. | 501/96 |
| 4,627,815 | 12/1986 | Aldinger et al. | 432/24 |
| 4,642,298 | 2/1987 | Kuramoto et al. | 501/96 |
| 4,659,611 | 4/1987 | Iwase et al. | 428/209 |
| 4,672,046 | 6/1987 | Sawamura et al. | 501/98 |
| 4,678,683 | 7/1987 | Pasco et al. | 427/123 |
| 4,720,362 | 1/1988 | Gentilman et al. | 264/1.2 |
| 4,746,637 | 5/1988 | Kasori et al. | 501/98 |
| 4,764,321 | 8/1988 | Huseby et al. | 264/65 |
| 4,766,097 | 8/1988 | Shinozaki et al. | 501/98 |
| 4,786,448 | 11/1988 | Fukuhara et al. | 264/65 |
| 4,810,679 | 3/1989 | Dole et al. | 501/98 |
| 4,818,455 | 4/1989 | Huseby et al. | 264/65 |
| 4,843,042 | 6/1989 | Dole et al. | 501/96 |
| 4,877,760 | 10/1989 | Okuno et al. | 501/98 |
| 4,883,780 | 11/1989 | Kasori et al. | 501/96 |
| 4,897,372 | 1/1990 | Huseby et al. | 501/96 |
| 4,950,435 | 8/1990 | Taniguchi et al. | 264/65 |
| 4,960,734 | 10/1990 | Kanai et al. | 501/98 |
| 5,063,183 | 11/1991 | Taniguchi et al. | 501/98 |
| 5,073,526 | 12/1991 | Enloe et al. | 501/96 |
| 5,077,245 | 12/1991 | Miyahara | 501/96 |
| 5,147,832 | 9/1992 | Shimoda et al. | 501/96 |
| 5,154,863 | 10/1992 | Miyahara | 264/65 |
| 5,165,983 | 11/1992 | Sugiura et al. | 428/141 |
| 5,214,005 | 5/1993 | Yamakawa et al. | 501/96 |
| 5,250,478 | 10/1993 | Ishida et al. | 501/98 |
| 5,320,990 | 6/1994 | Guiton et al. | 501/98 |

$\emptyset < 20°$ $\emptyset > 80°$

LOW TEMPERATURE SINTERING ROUTE FOR ALUMINUM NITRIDE CERAMICS

CROSS-REFERENCE TO RELATED APPLICATIONS

This application is a continuation-in-part of U.S. Ser. No. 08/172,032, filed Dec. 22, 1993 now U.S. Pat. No. 5,424,261.

FIELD OF THE INVENTION

The present invention is directed to ceramic bodies having electronic characteristics suitable for use as substrates for electronic packaging applications. More particularly, the invention is directed to sintered aluminum nitride substrates and having a high electrical resistivity, while exhibiting high density and high thermal conductivity, prepared by a low temperature pressureless sintering process compatible with metal ceramic laminate processing temperature regimes. These sintered aluminum nitride substrates are particularly useful for multilayer metal-ceramic based microelectronic packages.

BACKGROUND

As compared to alumina, the commercially predominant electronic ceramic, aluminum nitride ceramics potentially possess superior characteristics for electronic packaging applications with respect to electrical insulation, high thermal conductivity (above 120 W/m-K), thermal expansion match to silicon devices, and low dielectric constant. Aluminum nitride substrates are potentially useful where high heat dissipation is required in a microelectronic package, such as in a multilayer metal-ceramic package for high power devices. Aluminum nitride ceramics for microelectronic applications must therefore be capable of accommodating metallized components, polymeric layers and heat generating, high power electronic devices.

Prepared from aluminum nitride powders, in order to achieve suitable properties the ceramic must achieve a certain density, at least about 90%, preferably greater than or equal to about 95%, of theoretical. Aluminum nitride with no sintering additives decomposes below the temperature required to sinter it to maximum density. However, densification can be achieved at lower temperatures by the use of sintering aids.

Sintering aids liquify at temperatures below the decomposition and pure compound sintering temperatures for the ceramic, and promote densification of the ceramic grains by i) a particle rearrangement process mediated by capillary forces between the wetting liquid and the solid particles, and thereafter, ii) a dissolution and precipitation process. In this process, solid is preferentially dissolved at regions of high curvature (small particles) and redeposited at regions of low curvature (large particles). In addition, solid is preferentially dissolved at regions of solid-solid contact and redeposited away from the contact areas. At the later stages of the liquid sintering cycle, microstructure is refined via grain growth and coalescence processes.

Different combinations of sintering aids provide various compounds in situ which melt at different temperatures. The temperatures at which sintering occurs has an effect on the progress of the different types of sintering processes, and thus the microstructure and the final properties of the sintered ceramic body. Sintering aids also function to increase thermal conductivity of the sintered aluminum nitride body by gettering oxygen from the aluminum nitride powder. Thus, an effective sintering additive must form a liquid at low temperature capable of dissolving and reprecipitating aluminum nitride without oxidation of the aluminum nitride. Not every liquid at sintering temperature will be able to getter oxygen and densify the ceramic.

All commercially available aluminum nitride powders contain oxygen as an impurity. This oxygen primarily takes two forms in the powder, as an alumina coating on each of the powder particles, and as dissolved oxygen impurity within the crystalline lattice of the aluminum nitride particles. A minor amount will be tied up as an oxide of any metal impurities which may be present. At a given sintering temperature, only a certain amount of oxygen, primarily from surface alumina and secondarily from other sources, will be available for reaction (hereinafter "available oxygen").

Upon densification, the volume of the green body, and for multilayer structures the volume of the metal lamina contained in the green body, together with the linear dimensions of the body, decrease as a function of both the temperature experienced and the particular material involved. If the metal and ceramic shrink at different times and rates, this shrinkage mismatch leads to residual stresses between the different constituent materials in the sintered body and distorts the final shape of the body. In order to maintain the exacting geometric tolerances required by the electronic packaging industry for multilayer ceramic based packages, it is necessary that the ceramic and the metal sinter at approximately the same rate.

Thus it is desirable to facilitate efficient sintering of aluminum nitride at particularly low temperatures to mediate the problems associated with different sintering rates and thermal expansion mismatches between the ceramic and metal portions of a multilayer electronic package.

The use of lower sintering temperatures by the art, however, has generally resulted in properties degrading from the desired theoretical levels. For instance, the electrical resistivities of some aluminum nitride sintered bodies, particularly those AlN substrates sintered with calcia and yttria containing sintering aids as discussed below, have been found to be unacceptably low (on the order of $10^8$ $\Omega$-cm) for certain electronic packaging applications, and therefore, the substrates are not believed suitable for use as insulating substrates for electronic packaging applications.

At least some of these less than desirable properties may result from the failure of the sintering aids to either form an effective sintering liquid needed to densify the ceramic or to remove dissolved oxygen from the AlN lattice, and/or from the formation of an additional phase or additional phases within the AlN structure which comprise reaction products of the sintering aid(s), aluminum and oxygen.

Sintering aids for AlN which have been disclosed in the art include Group IIa, Group IIIa, and/or rare earth compounds, including calcia and yttria, among others. Resulting AlN sintered bodies are disclosed to contain alkaline earth-aluminates, Group IIIa-aluminates, rare earth-aluminates, and/or AlON.

U.S. Pat. No. 4,618,592 discloses the use of sintering aids for aluminum nitride which are at least one metal element selected from alkaline earth metals, lanthanum group metals and yttrium or a compound thereof.

U.S. Pat. No. 4,746,637 discloses sintering aluminum nitride powder in mixture with a rare earth compound and an alkaline earth metal compound. U.S. Pat. No. 5,077,245 discloses sintering aluminum nitride using as sintering aids at least one metal or compound of a Group IIa metal such as Ca and at least one metal or compound of a Group IIIa metal such as Y and rare earth compounds. Mixed oxides of Group IIa/IIIa metals and alumina were identified in aluminum nitride sintered with these sintered aids. In Sainz De Baranda, Pedro, "The Effect of Calcia and Silica on the Thermal Conductivity of Aluminum Nitride Ceramics", A doctoral dissertation, Rutgers University, (Vol. 52/07-B of Dissertation Abstracts International, p 3846.), two ternary oxide second phase compounds were identified in aluminum nitride bodies sintered using yttria and calcia (calcium nitrate) sintering aids, namely $CaYAlO_4$ and $CaYAl_3O_7$. Sainz De Baranda also observed that with the addition of calcia as a sintering aid, the second phase became more wetting of the grain boundaries, and low dihedral angles were observed (Pages 193 and 199–200).

U.S. Pat. No. 5,165,983 discloses a method to sinter a plurality of AlN plates containing oxides of aluminum, rare earth, and Group IIIa metal elements superposed on a ceramic support base with a ceramic powder interposed between the base and the plate and between the plates.

Japanese Kokai J02-275,769 discloses additions of aluminum, calcia and boria to aluminum nitride powder, followed by sintering at 1400–2000 degrees Centigrade. However, to achieve a fully dense body having a thermal conductivity of 192 W/m-K, the compositions were sintered at 1800 degrees Centigrade for 4 hours.

Japanese Kokai J62-176,961 discloses additions of alumina, calcia and boria (as well as others) to aluminum nitride to achieve a sintered body with improved density and thermal conductivity. Boria, however, melts at about 450 degrees Centigrade which presents difficulties in electronic packaging applications. For example, it is necessary to remove substantially all residual carbon from substrates that are used in electronic applications. The low melting boria hinders this so-called binder burn-off process.

Japanese Kokai J03-218,977 discloses the addition of 0.1–10 weight percent of a glass powder sintering aid to the aluminum nitride powder prior to sintering. The glass powder consists of 0–38 mole % alumina, 30–80 mole % boria and 20–56 mole % calcia.

In weight percent, it is 0–28 weight % alumina, 27–77 weight % boria and 23–64 weight % calcia. The aluminum nitride body is sintered at a temperature greater than 1650 degrees Centigrade which is undesirably high. The resulting aluminum nitride samples have a maximum thermal conductivity of 110 W/m-K which, while better than alumina, is considerably less than pure aluminum nitride. Further, the majority of samples had a thermal conductivity of 100 W/m-K or less.

Beyond this art, we have now found that particular second phase compositions retained in the sintered aluminum nitride ceramic body following sintering, while effective in providing density to the aluminum nitride during the sintering process and enhanced thermal conductivity in the sintered body, contribute to the degradation of other necessary characteristics in the electronic packaging substrate, particularly electrical resistivity.

We have found that in sintered aluminum nitride bodies, the presence of residual calcium-aluminate (calcia) containing species is associated with very low resistivity. In fact, when certain calcium aluminate species are exposed during sintering to the environment of a refractory metal furnace, the second phase becomes conductive. This is a deleterious characteristic for an electronic packaging substrate, which must be insulating in order to isolate conductive paths for carrying signals and power to and from semiconductor chips.

Although sintering for longer times and/or at higher temperatures can volatilize or decompose calcia-based species from monolithic ceramics, this tends to degrade other desirable characteristics, as noted above. Also, for co-fired, heavily metallized multilayer ceramic packages, this technique is not effective. In the metal-ceramic laminates, dense metal planes sinter very early during the sintering process, and trap volatile species in the ceramic layers between them. Extended or higher temperature sintering are not able to remove these species from the ceramic.

Second phase compositions which remain trapped in the ceramic layers between the dense metal layers in co-fired multilayer substrates exhibit very low resistivity and result in sintered body microstructures which are unsuitable for electronic packaging applications.

Thus, it is an object of the present invention to produce an aluminum nitride body that has high electrical resistivity, is fully dense and is highly thermally conductive by sintering at a lower sintering temperature than has heretofore been feasible and which will allow the production of the aluminum nitride body at a reduced cost.

It is another object of the present invention to produce an aluminum nitride body that has high electrical resistivity, is fully dense and is highly thermally conductive, by sintering at a temperature which is compatible with metal-ceramic laminate processing.

It is still another object of the present invention to produce an aluminum nitride body that has high electrical resistivity, is fully dense and is highly thermally conductive, by sintering at low sintering temperatures, while being able to control the certain compositional and microstructural characteristics of the ceramic body so as to provide substrates which are suitable for electronic packaging applications.

These and other purposes of the present invention will become more apparent after referring to the following detailed description of the invention.

SUMMARY OF THE INVENTION

An aluminum nitride ceramic having desired properties suitable for electronic packaging applications can be prepared from a novel aluminum nitride powder/sintering aid presintering mixture.

The sintering aid comprises a glassy component formed from alumina, calcia and boria, and an additional non-vitreous component comprising an element, compound or preferably a crystalline metal oxide, of a metal selected from Group IIa, IIIa, or the lanthanides, reactible with the crystallized glass component and alumina from the aluminum nitride grains.

Alternatively, the sintering aid comprises a multi-component glass composition capable of forming the above components upon melting and thereafter crystallizing upon reaction. In this alternative embodiment, optionally an additional non-vitreous component described above is added to the presintering mixture.

Therefore, a presintering aluminum nitride powder/sintering aid mixture wherein the aluminum nitride contains alumina and wherein the sintering aid comprises a) an element or compound of a metal selected from the group consisting of Group IIa, IIIa, lanthanide metals and mixtures thereof, and b) a glassy component formed from alumina, calcia, and boria, the metal element or compound being reactible with the glassy component and the alumina from the AlN to form a second phase containing a calcium containing component upon sintering, the calcium containing component of said second phase being in contact with aluminum nitride at a dihedral angle sufficient to provide a resistivity of at least about $10^8$ Ω-cm upon heat treatment.

A presintering aluminum nitride powder/sintering aid mixture wherein the aluminum nitride contains alumina and wherein the sintering aid comprises a) an element or compound of a metal selected from the group consisting of Group IIa, IIIa, lanthanide metals and mixtures thereof, and b) a glassy component formed from alumina, calcia, and boria, wherein the presintering mixture is sintered, at a sintering temperature between 1550° C. and 1800° C., to form a sintered body having a second phase containing a calcium containing component; the sintered body being cooled to at least below 1500° C.; and heat treated at a temperature of at least 1300° C. but below the sintering temperature for a period of time sufficient to cause the calcium containing component second phase to at least partially dewet from the aluminum nitride so as to contact the aluminum nitride at a dihedral angle sufficient to provide a resistivity of at least $10^8$ Ω-cm.

A presintering aluminum nitride powder/sintering aid mixture wherein the aluminum nitride contains alumina and wherein the sintering aid comprises a glassy component formed from a) an oxide of at least one metal selected from the group consisting of Group IIIa, lanthanide metals and mixtures thereof, and b) alumina, calcia, and boria, the glassy component being reactable with the alumina from the AlN to form a second phase containing a calcium containing component upon sintering, the calcium containing component of said second phase being in contact with aluminum nitride at a dihedral angle sufficient to provide a resistivity of at least about $10^8$ Ω-cm upon heat treatment.

A presintering aluminum nitride powder/sintering aid mixture wherein the aluminum nitride contains alumina and wherein the sintering aid comprises a glassy component formed from a) an oxide of at least one metal selected from the group consisting of Group IIIa, lanthanide metals and mixtures thereof, and b) alumina, calcia, and boria, and wherein the presintering mixture is sintered, at a sintering temperature between 1550° C. and 1800° C., to form a sintered body having a calcium containing second phase; the sintered body being cooled to at least below 1500° C.; and heat treated at a temperature of at least 1300° C. but below the sintering temperature for a period of time sufficient to cause the second phase to at least partially dewet from the aluminum nitride so as to contact the aluminum nitride at a dihedral angle sufficient to provide a resistivity of at least $10^8$ Ω-cm.

The preferred processes for producing sintered aluminum nitride bodies comprise preparing one of the presintered mixtures as set forth above; sintering, in a sintering atmosphere to a sintering temperature between about 1550° C. and 1800° C. to form a sintered body having a second phase containing a calcium containing component; cooling the sintered body to a temperature at least below 1500° C.; and heat treating said sintered body at a temperature of at least 1300° C. but below the sintering temperature for a period of time sufficient to cause the calcium containing component of said second phase to at least partially dewet from the aluminum nitride so as to contact the aluminum nitride at a dihedral angle sufficient to provide a resistivity of at least $10^8$ Ω-cm.

A sintered aluminum nitride body having low camber, high dimensional stability, at least 95% theoretical density and a thermal conductivity of at least 120 W/m-K comprising aluminum nitride and a calcium containing second phase containing a pseudo-quaternary compound containing Ca, Y, Al, and O and having substitutional boron contained within the compound, the second phase being in contact with the aluminum nitride at a dihedral angle sufficient to provide a resistivity of at least about $10^8$ m-cm.

Aluminum nitride sintered bodies having enhanced properties can be obtained using the novel sintering aid package within the sintering system even at a low maximum sintering temperature, such as 1550° C.–1700° C. Thermal conductivities observed in AlN bodies sintered at 1600° C. to 1625° C. maximum range from 126–190 W/m-K as measured by the laser flash technique.

DETAILED DESCRIPTION

Figure 1:
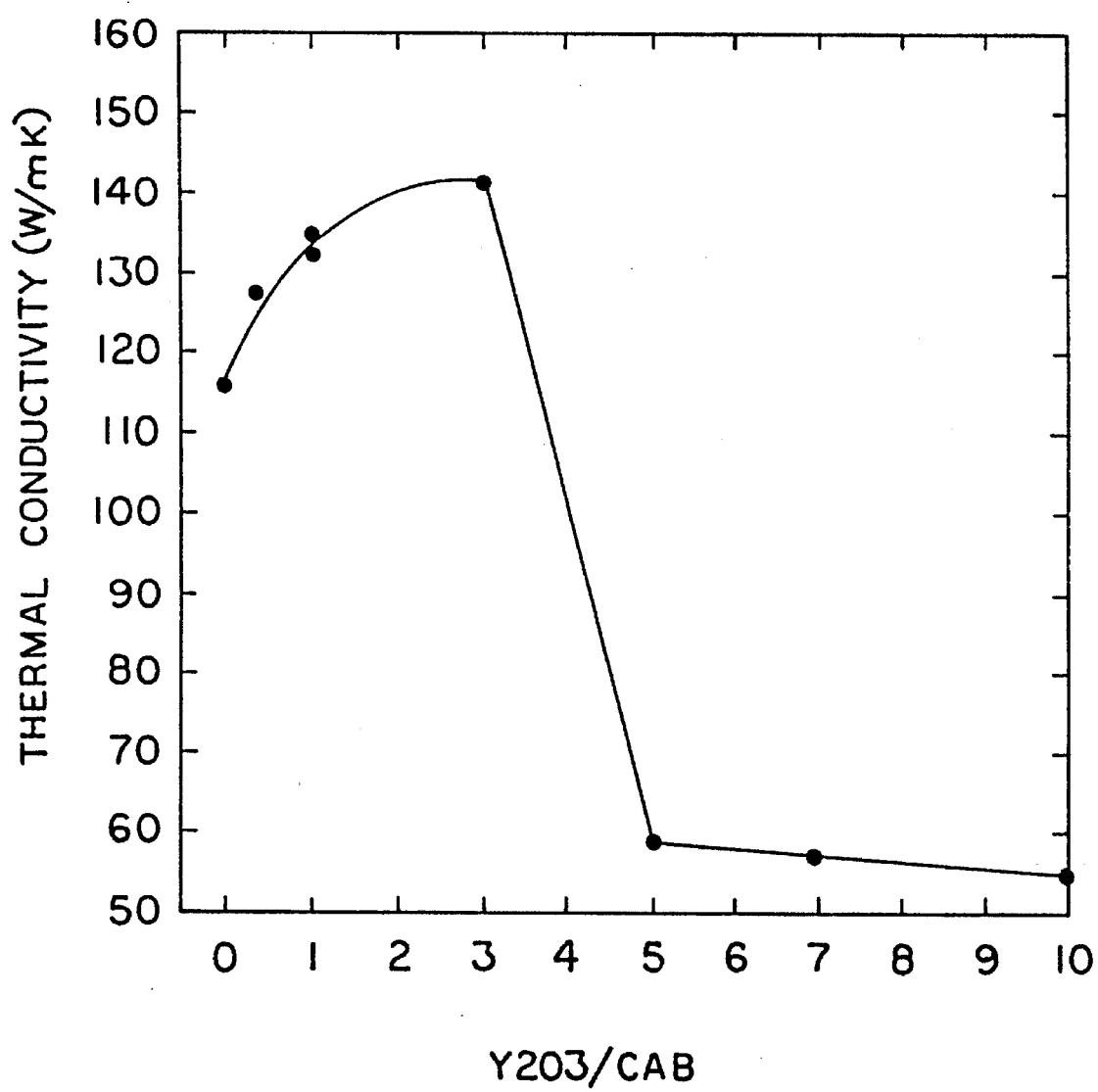
FIG. 1 is a graphical representation of thermal conductivity of sintered aluminum nitride bodies sintered with varying ratios of metal oxide to glassy component as sintering aids.

The formation of polycrystalline aluminum nitride sintered bodies having the density, camber and dimensional control, electrical resistivity, thermal conductivity, thermal expansion match with silicon and dielectric properties required for electronic packaging applications has been achieved by pressureless sintering of an aluminum nitride powder containing mixture at low sintering temperatures, namely 1550°–1700° C. and preferably 1550°–1650° C. This temperature regime is suitable for the simultaneous sintering of multiple metal and ceramic layers known in the art as co-fired multilayer electronic packages. As used herein the term "low temperature" as it relates to sintered AlN bodies means an AlN body which is sintered at temperatures (<1700° C.) which are comparatively lower than temperatures at which the body would typically be sintered.

We have identified sintered aluminum nitride bodies having at least 90% (and preferably 95%) theoretical density and a thermal conductivity of at least 100 W/m-K (and perferably 120 W/m-K) comprising aluminum nitride and a second phase containing at least one compound comprising the mixed oxides of calcium, yttrium, and aluminum, which may include the quaternary compound $CaYAl_3O_7$, and may have substitutional boron contained within the second phase ternary metal oxide. We have observed these characteristics in co-fired multilayer AlN sintered bodies, having multiple alternating layers of metal and ceramic.

However, even when density and thermal conductivity are met, we have found that the second phase achieved may result in resistivity of the sintered aluminum nitride body which is too low to be suitable for use in electronic packaging applications. We have now found that high resistivity, polycrystalline aluminum nitride bodies can be produced which exhibit target density and thermal conductivity properties, and which are excellent for electronic packaging applications despite the existence of potentially conductive second phase compositions.

Components of the mixture which are sintered to form the polycrystalline body include aluminum nitride powder, preferably having a low oxygen content (such as F-grade sold by Tokuyama Soda, although H-grade and Dow Chemical grades 44 and 48 are also suitable), a conventional binder such as polyvinylbutyral (PVB), ethyl cellulose or polymethyl methacrylate, and the novel sintering aid package.

In one embodiment, the sintering aid comprises at least two components, a glassy component and at least one metal element or compound, preferably a crystalline metal oxide or a compound convertible to a crystalline metal oxide, of Group IIa, IIIa, or the rare earth metals (lanthanides).

The glassy component is formed by rapid quenching, such as splat quenching between steel plates or by roller quenching between cooled drums, of a melt of the constituent components. These components include alumina, calcia and boria. Preferred are glass compositions of calcia-alumina-boria in compositional ranges that will form glasses using conventional rapid-quench techniques. An example is a glass formed by splat quenching from a melt derived from $CaO/Al_2O_3/B_2O_3$, referred to below as "CAB glass". The glassy component is added to the mixture containing the AlN powder in comminuted, or powder, form.

Suitable CAB glass compositions comprise vitreous compositions formed from a mixture of calcia, alumina, and boria in the preferred proportion of calcia between 40 and 80 weight percent, alumina between 10 and 50 weight percent, and boria between 3 and 25 weight percent. More preferred is an embodiment wherein the components are present in a proportion of calcia between 45 and 65 weight percent, alumina between 20 and 45 weight percent, and boria between 5 and 20 weight percent. Most preferred is an embodiment wherein the components are present in a proportion of calcia between 45 and 55 weight percent, alumina between 30 and 40 weight percent, and boria between 5 and 15 weight percent.

The glassy component is prepared by forming a mixture of the component metal oxides and melting the mixture to form a vitreous solid upon cooling. For the CAB glass components, a suitable melting temperature is about 1450° C. to form a homogeneous liquid. The homogeneous liquid is quenched to form glassy ribbons. The quenched ribbon is pulverized or comminuted to obtain a desired particle size which is suitable for addition to the aluminum nitride powder before sintering, forming in part the novel presintering mixture. A suitable particle size for use as an aluminum nitride sintering aid is about 3 to about 5 microns.

The Group IIa, IIIa, or lanthanide (rare earth) metal compound is preferably a crystalline metal oxide. Alternatively it is a compound convertible to the metal oxide in the sintering environment and which has no constituent which would be deleterious to the properties desired in the sintered AlN body. The crystalline metal oxide must be capable of reacting at a temperature within the sintering regime with crystallized glass components and alumina from the AlN grains to form at least one crystalline phase. An example of a suitable metal oxide of Group IIa is calcia and of Group IIIa is yttria.

Group IIa metals or compounds thereof which can be used as effective sintering aids in the present invention include Ca, Sr, Ba and mixtures thereof. Group IIIa or rare earth metals and compounds thereof which can be used as effective sintering aids in the present invention include Y, La, Ce, Nd, Sm, Eu, Gd, Tb, Dy, Ho, Er, Tm, Yb, Lu, and mixtures thereof. Compounds of the above metals which may function as sintering aids for aluminum nitride according to the present invention include but are not limited to oxides, carbonates, nitrates, sulfates, fluorides and mixtures thereof. The designations of the sub groups of the elements in this Specification follow the nomenclature adopted by the International Union of Pure and Applied Chemistry (IUPAC).

Alternatively, the sintering aid package may comprise a multi-component glassy composition derived from a melt containing in addition to alumina, calcia and boria as set out above, a metal oxide selected from the crystalline metal oxides described above. An example is a glass having the constituent elements Ca-Al-B-Y-O. A range of compositions derived from the components $CaO-Al_2O_3-Y_2O_3-B_2O_3$, can be obtained in the vitreous form by quenching. The melting points of the crystallized materials are in the range of about 1200°–1350° C., and therefore are highly suitable as sintering aids for aluminum nitride below 1700° C., and preferably below 1600° C. In alternative embodiments, alumina in the form of metal oxide is added to the sintering aid/glassy component containing presintering mixture.

Further exemplification of the sintering aid package will be represented below by an embodiment which comprises a glassy component having the constituent elements Ca-Al-B-O (CAB glass) and the crystalline metal oxide yttria. The preferred ratio of the crystalline metal oxide to the glassy component is about 1:1 to about 3.5:1, and most preferably is within the range of about 2:1 to about 3:1. For ratios above the stated range, there is a sudden drop in both the density and the thermal conductivity of the resulting sintered AlN product, as is demonstrated for thermal conductivity in FIG. 1. Data represented in FIG. 1 was taken from AlN samples sintered at about 1600° C. for 10 hours in a refractory metal furnace.

The AlN powder, binder and sintering aid package powder are mixed and are formed or shaped into green bodies by conventional procedures, such as dry pressing or sheet casting. To form multilayer ceramic bodies, sheets of AlN green body are printed with a metal paste, such as metal pastes derived from refractory metals such as molybdenum and tungsten, optionally having ceramic additives such as AlN. The printed green sheets are laminated together under heat and pressure prior to sintering to form a structure having multiple alternating layers of metal and ceramic.

Sintering is carried out in a high temperature furnace, for example, a graphite or a refractory metal furnace. The sintering system must be configured to supply an atmosphere which contains an suitable sintering gas for aluminum nitride, such as nitrogen, and at the appropriate temperatures, vapors of various components of the sintering aid package. When a refractory metal furnace is utilized, the sintering atmosphere should additionally contain a gas to protect the furnace elements, such as hydrogen.

The sintering process is begun with a ramping of the temperature from the ambient to the desired sintering temperature at which the AlN is held for a period of time effective to complete densification and oxygen gettering. It is unnecessary to utilize a separate binder burnout step when using the above sintering aid package. Binder burnout can be accomplished in situ within the sintering furnace.

Figure 2:
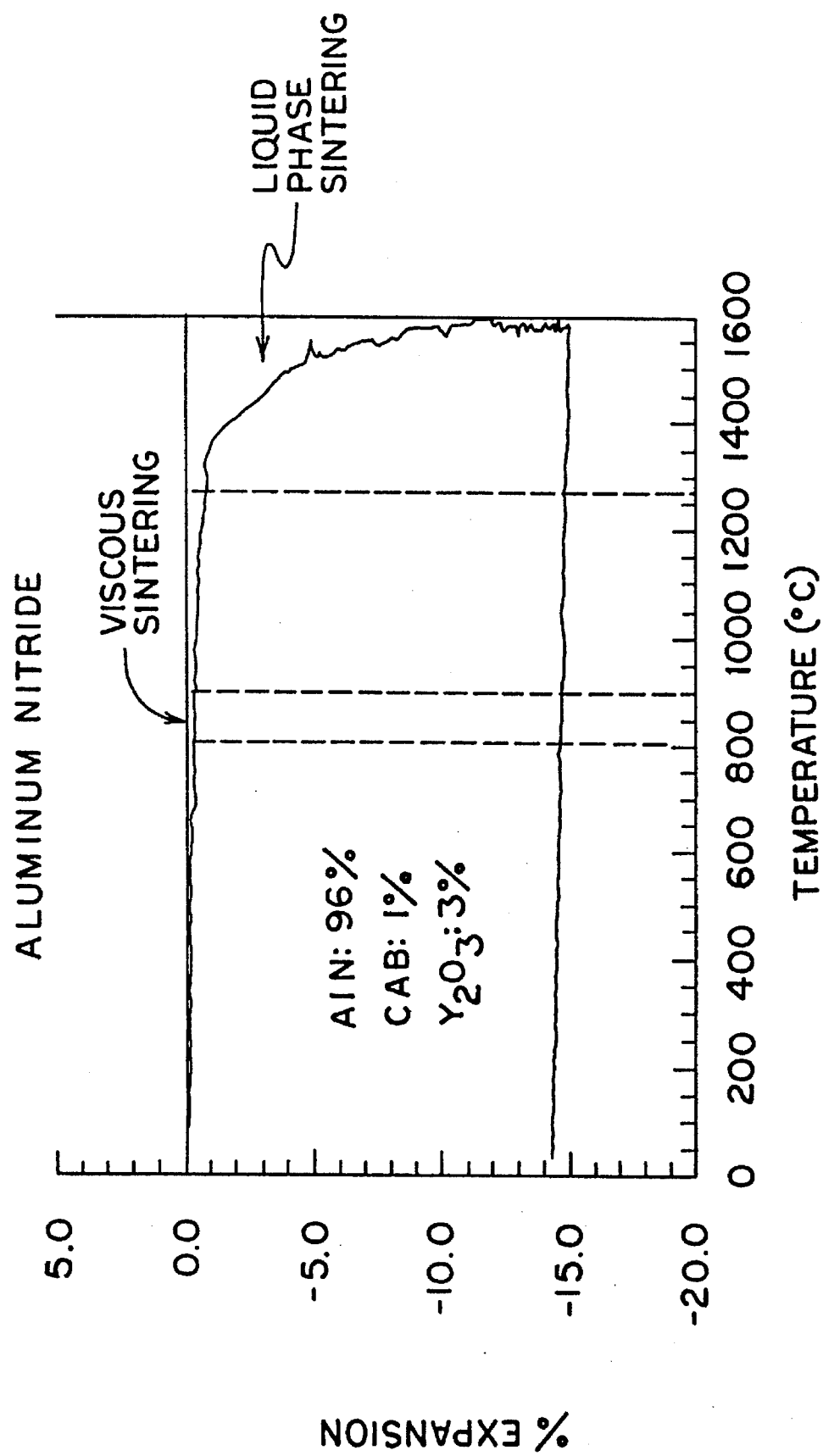
FIG. 2 is a graphical representation of the change in density during sintering of an aluminum nitride body.

At a temperature of about 800°–900° C. the glassy component becomes a highly viscous flowable solid and viscous sintering of the ceramic commences. A slight densification occurs, as is depicted by the negative "expansion" or contraction shown in the dilatometry trace of FIG. 2. As temperature is increased between about 900°–1200° C., the glass begins to crystallize.

At above a temperature of about 1200° C. the crystallized glass melts. At this liquid phase-assisted sintering regime further densification occurs and reaction begins to take place with oxygen from the low temperature sintering phase, the AlN grains and the crystalline oxide to prevent oxygen from entering the AlN lattice, to provide high thermal conductivity in the final product, and to form a crystalline phase. In this area of the temperature regime it is necessary, in order to provide effective and uniform sintering, that a boron oxide vapor component be maintained in the furnace atmosphere in the vicinity of the AlN part so that all the boria present within the body or part does not evaporate away.

At a temperature of about 1500° C. the liquid which is formed from the crystalline phase contains the components Ca-Al-Y-B-O. The temperature is increased to at least about 1550° C.–1700° C., preferably about 1550° C.–1650° C. and more preferably about 1550° C.–1600° C. and held for an effective period of time. At this temperature regime substantial densification occurs as is further defined in FIG. 2. In order to attain the highest percentage of theoretical densification, however, it is necessary to provide a partial pressure of the liquid component in the furnace atmosphere in the vicinity of the AlN part so that an effective amount of the high temperature liquid component remains in the part for a period of time sufficient for final densification to occur.

In addition to introduction of the desired vapor into the sintering furnace or generation in situ by volatilizing the component in the sintering furnace, proper furnace atmosphere can be maintained by performing the sintering operation in a container within the furnace with a specified ratio of "free volume" to parts and carriers within the container volume. The container must be capable of surviving the temperature and reactants experienced in the sintering operation, and must not form reaction products with the ceramic or out-gasses which would be deleterious to the sintered AlN or cofired metal/AlN product or their properties. An acceptable range of free volume for the specific embodiment exemplified below, in which the samples comprised 4 parts by weight of sintering aid to 100 parts of aluminum nitride powder, is preferably about seventy-five percent (75%) or above, and would vary as the amount of sintering aid varies.

The carriers for the AlN parts must not stick to the parts during or after the sintering procedure and must not interfere with the densification of the parts (for example, out-gases must be permitted to escape). The application of weight to the AlN parts during the sintering procedure provides an increased degree of control to minimize the camber of the sintered parts.

SPECIFIC EXAMPLES

Example A Example 1)

AlN powder (Tokuyama Soda Grade-F) was mixed with 3 wt. % yttria (based on the AlN weight), 1 wt. % CaO-alumina-$B_2O_3$ glass (50/40/10 by weight) formed by melt quenching, and 8 weight percent PVB binder. This mixture was dried and pressed at 16,000 psi into a 0.25" diameter pellet and sintered in a refractory metal furnace at 1600° C. for 10 hours. The resulting AlN ceramic had a density of greater than 98% of the theoretical value and a thermal conductivity measured by laser flash of 158 W/m-K.

Example B (Example 2)

The same mixture as in Example A was combined with PVB binder and tape cast to produce ceramic green sheets 0.010 inches thick. These sheets were extrusion printed with a tungsten paste (using ethyl cellulose as a binder) to form a metallization layer. Several sheets were then laminated together at 85° C. for 6 minutes at 4000 psi to produce a multilayer ceramic and metal body, and then sintered in a refractory metal furnace at 1600° C. for 5 hours. The resulting multilayer ceramic and metal body had a ceramic density greater than 98% of the theoretical value, metal density greater than 85% of the theoretical value and a thermconductivity measured by laser flash of 126 W/m-K.

The aluminum nitride sintered bodies prepared according to the above procedures have characteristics and properties desirable for electronic packaging applications. The AlN sintered bodies have a density greater than 97%, with 99% being typically achieved. The thermal conductivity is generally between 135–143 W/m-K, and values of 190 W/m-K have been observed in parts held at the sintering temperature of 1600° C. for 64 hours.

Furthermore, the AlN sintered bodies, even when sintered at these low temperatures, have an electrical resistivity of at least about $10^8$ $\Omega$-cm or more. Preferably, the metal resistivity is less than 3 times the value of the bulk metal. Also, dielectric properties are within acceptable ranges. Typically, the sintered AlN body has a dielectric loss at 1 kHz of less than about $10^{-2}$.

The sintered AlN parts have a low camber, and good dimensional control in the X,Y, and Z directions equal to that achieved by sintered alumina. Dimensional (shrinkage) control is achievable even with the application of weight to the sintering part, as the effects of weight on dimensional control are overcome by the effects of the sintering aid package and sintering atmosphere control to achieve "free" sintering conditions.

The second phase present in the sintered AlN body is dependent upon the metal oxide:glassy component ratio, in a preferred embodiment the Y:CAB glass ratio, as well as the sintering temperature and time (atmosphere control being assumed). A second phase can be formed in the ceramic which contains quaternary or pseudoquaternary compounds comprising the mixed oxides of aluminum and the sintering aid metals. High ceramic density and high thermal conductivity is accomplished by reaction of the sintering phase with native alumina to achieve the second phase components desired and to minimize or eliminate any residual carbon and/or alumina (available oxygen) remaining in the aluminum nitride body.

As used herein, by quaternary is meant that a specific four component composition is formed which is a stoichiometric oxide of the three metals: aluminum, Group IIa sintering aid metal (represented by calcium), and Group IIIa/rare earth sintering aid metal (represented by yttrium). These quaternary compounds may also include substituted boron such that they are considered pseudo-quaternary. By pseudo-quaternary is meant that a four component composition is formed which is a non-stoichiometric, substituted metal aluminate, in which one of the sintering aid metals forms the aluminate and the other substitutes within the structure of the compound either interstitially or for one of the other metals. A preferred second phase is a combination of $CaYAl_3O_7$ with substitutional boron and YAP.

Continuation of sintering, even at 1600° C. will deplete the boron substituted ternary metal oxide phase in favor of yttria aluminates, and continued sintering beyond that will result in only yttria being present as a second phase. With milder sintering conditions (time or temperature), calcia-borates, calcia-aluminates and yttria-calcia-aluminates are possibly present in the sintered body.

Analysis of sintered aluminum nitride bodies prepared at low sintering temperatures from aluminum nitride powder and a sintering aid of yttria and CAB glass as described above revealed by transmission electron microscopy (TEM) a uniform distribution of wetted second phase in an AlN matrix. X-ray diffraction (XRD) and energy dispersive x-ray spectroscopy (EDS) identified thin layers of second phase extending along grain boundaries as comprising $CaYAl_3O_7$, with some de-wetted YAP particles also being present. EDS identified YAP as containing a significant amount of calcium (Ca) in solid solution. Secondary ion mass spectrometry (SIMS) identified boron (B) as being present within the $CaYAl_3O_7$.

Example C (Examples 3–22)

Aluminum nitride powder was prepared into green body sheets containing about 3.85 weight percent sintering aid total, including powdered metal oxide and glassy sintering additives in weight proportions as set forth in Table I and 8 weight percent of PVB as a binder. The weight proportion of the CAB components were 50% calcia, 40% alumina, and 10% boria. The green sheets were sintered together in a refractory metal furnace at 1600° C. for 10 hours (ramping at 4° C. per minute to temperature). In examples 3–18, tungsten setters were utilized in the sintering furnace, while in examples 19–22, molybdenum setters were utilized.

A comparison was made of the results obtained in density and thermal conductivity for the AlN bodies sintered with the different additive packages. The preferred presence of the boria component in the vitreous mixture (glassy phase) and the utilization of the glassy component sintering aid resulted in an increase in the thermal conductivity of the final sintered body and generally in a surprising increase in density, as compared to counter examples in which an equal weight proportion of metal oxide (not vitreous) was substituted for the glassy component.

TABLE I

| Example | Sintering Aid Composition | Density g/cc | Thermal Conduct. k (W/mK) |
|---|---|---|---|
| 3 | 3Y/1CAB | 3.00 | 134 |
| 4 | 3Y/1CAB | 3.01 | 141 |
| C 5 | 3Y/1CA | 3.12 | 117 |
| C 6 | 3Y/1CA | 3.12 | 125 |
| 7 | 3Y/1CAB/0.7 $Al_2O_3$ | 3.13 | 141 |
| 8 | 3Y/1CAB/0.7 $Al_2O_3$ | 3.14 | 141 |
| C 9 | 3Y/1CA/0.7 $Al_2O_3$ | 3.10 | 140 |
| C 10 | 3Y/1CA/0.7 $Al_2O_3$ | 3.10 | 149 |
| 11 | 3Y/1CAB/1.0 $Al_2O_3$ | 3.20 | 148 |
| 12 | 3Y/1CAB/1.0 $Al_2O_3$ | 3.20 | 151 |
| C 13 | 3Y/1CA/1.0 $Al_2O_3$ | 3.14 | 137 |
| C 14 | 3Y/1CA/1.0 $Al_2O_3$ | 3.14 | 132 |
| 15 | 3Y/1CAB/1.5 $Al_2O_3$ | 3.23 | 145 |
| 16 | 3Y/1CAB/1.5 $Al_2O_3$ | 3.23 | 143 |
| C 17 | 3Y/1CA/1.5 $Al_2O_3$ | 3.20 | 135 |
| C 18 | 3Y/1CA/1.5 $Al_2O_3$ | 3.20 | 139 |
| 19 | 3Y/1CAB | 3.25 | 144 |
| 20 | 3Y/1CAB | 3.25 | 142 |
| C 21 | 3Y/1CA | 3.21 | 138 |
| C 22 | 3Y/1CA | 3.21 | 129 |

CAB = Calcia/Alumina/Boria vitreous powder
CA = Calcia and Alumina (not in vitreous form)
Y = Yttria In the above examples according to the present invention, yttrium oxide was added separately from the glassy components in the crystalline phase, and therefore, it is assumed to have undergone solid state reaction similar to its function in high temperature sintering.

In addition, a Group IIIa/rare earth metal compound such as yttrium oxide can also be added as a component of the vitreous phase, and upon the melting of this phase, which in a preferred embodiment contains yttrium oxide, it will begin working as a sintering aid at a lower temperature. Even though additional yttrium oxide may be added in the crystalline phase to supplement the amount needed for gettering oxygen in the aluminum nitride body to improve the resulting thermal conductivity, it is preferred in this alternative embodiment to have at least part of the yttrium oxide additive (from the glassy component) present in a liquid form at the earliest stage of the sintering reaction to accomplish effective low temperature sintering.

In this embodiment, the vitreous material may be formed by quenching a melt containing yttrium oxide in the proportion of about 10 to greater than 20 weight percent in the $CaO-Al_2O_3-Y_2O_3$ system when the remaining $CaO/Al_2O_3$ is present in a proportion of 40/60 percent by weight to 60/40 percent by weight, preferably in a 50/50 percent by weight ratio. Addition of $B_2O_3$ in the amount of 5–10 weight percent makes the viscosity of the liquid phase near the sintering temperature very low, and therefore advantageous for the initial stage of the liquid phase sintering of the aluminum nitride. Depending upon sintering conditions, it is possible that $B_2O_3$ will leave the system toward the completion of the sintering to reduce the amount of second phase in the sintered body.

Example D (Examples 23–24)

Sintering additives were prepared by melting oxide components and quenching between steel plates to obtain vitreous materials of the following compositions by weight percent: of $CaO/Al_2O_3/Y_2O_3/B_2O_3$, in the proportions 40/40/10/10 and 40/30/20/10. In these cases, differential thermogravimetric analysis (DTA) thermograms showed the melting points at 1228°–1300° C. All melts were very fluid and suitable for use according to the present invention as set forth above.

For slurry casting of aluminum nitride presintered bodies (green sheets) a mixture is made consisting of ceramic materials (aluminum nitride powder plus the pulverized vitreous mixture), binder, solvent and minor conventional constituents such as plasticizers and anti-oxidants. The binder may be about 5 to 15 weight percent while the solvent amounts to about 20 to 45 weight percent, the remainder being the ceramic materials. The slurry is cast on to a carrier sheet, which conventionally may be Mylar. Upon drying, the carrier sheet is removed and a tape of the product is produced. The tape is blanked into the desired endshape. One desired endshape is a green sheet for fabricating multilayer ceramic packages.

Multilayer ceramic packages may be fabricated by the following process. A series of green sheets are punched to form "vias" and then a metallic paste is screened onto the green sheets, to form conductive lines, and into the vias to form conductive pathways between the different layers of green sheets. For aluminum nitride products, the preferred metallic pastes contain molybdenum or tungsten. The green sheets are then stacked, laminated and sintered to obtain a multilayer ceramic package. In use, at least one semiconductor device is mounted on the multilayer ceramic package. The multilayer ceramic package is a preferred use of the present invention.

The aluminum nitride body may be sintered in a conventional furnace so long as there is a protective atmosphere. A preferred atmosphere is forming gas which is a mixture of nitrogen and hydrogen gases. A typical sintering schedule can be undertaken as follows. The unsintered aluminum nitride bodies are inserted into a sintering furnace. A protective atmosphere such as dry forming gas ($N_2$+10–20% $H_2$) is used throughout the sintering process. Over a period of about 5 hours, the temperature is ramped up from room temperature to about 600° C. to pyrolyze the binder. Then, over a period of about 8 hours, the temperature is ramped up to the sintering temperature of about 1550°–1700° C., preferably about 1550°–1650° C. and held at the sintering temperature for about 5 hours. Then, over a period of about 5 hours, the temperature is ramped down to room temperature.

For slurry casting, it is preferred that the proportions of the components of the vitreous mixture, in weight percent, are 5–20% boria, 20–45% alumina and 45–65% calcia. For greatest density and thermal conductivity, it is most preferred that the proportions of the components of the vitreous mixture, in weight percent, are 5–15% boria, 30–40% alumina and 45–55% calcia. The metal oxide component is preferably yttria.

Resulting metal-ceramic laminates (for multilayer electronic packages) exhibit high density, high thermal conductivity, and excellent camber and dimensional control.

Continuing, we have also found that the electrical resistivities of the AlN sintered bodies are much higher than those AlN sintered bodies of the prior art which are often too low for utilization as insulating substrates for electronic packaging applications. In particular, we have found that any second phase microstructure of the prior art, produced according to the processes noted above, which contains calcium, including calcium aluminate, and to a certain extent, the calcium containing quaternary phase exhibits lowered electrical resistivity. This phenomenon was found to be more pronounced in multilayer metal-ceramic packages, although it was found to be present in monolithic ceramic substrates as well.

The measurement of a large number of AlN substrates sintered with calcia and yttria containing sintering aids has revealed that the bulk D. C. ceramic resistance can be unacceptably low for electronic packaging applications (i.e. less than $10^8$ Ω as measured with 1 cm pressure contacts at 100 V). Other nonelectronic applications such as electrostatic chucks, also require high ceramic resistivity. The typical application of AlN substrates microelectronics requires the resistivity of the ceramic to be greater than $10^8$ Ω-cm, and in most instances, greater than $10^{10}$ Ω-cm. Some applications may require even higher resistivity values, particularly in high voltage, high current applications.

Example E

A number of 9 layer co-fired metal-ceramic laminate, aluminum nitride packages were fabricated for testing according to the following procedures. The ceramic was prepared from a presintering mixture of aluminum nitride powder, 3 weight % yttria powder and 1 weight percent powdered calcia-alumina-boria (CAB) glass (50/40/10 weight % ratio), which was tape cast, blanked, printed with metallization and laminated to produce multilayer laminated ceramic—metal packages. These packages were sintered at 1625° C. for 24 hrs following binder burnout, and resulted in dense ceramic with thermal conductivities near 150 W/m-K. These samples had a second phase composition made up of YAP, the quaternary compound (or boron-substituted quaternary compound), and a small amount of calcium aluminates. In addition to these co-fired packages, a number of unmetallized "blanks" were also fabricated. Initial electrical testing of these parts indicated that the sintered ceramic had a very low resistivity, particularly in regions between dense metallization in the co-fired package, but also in the bare ceramic blanks. The low resistivity parts also had a distinct green color.

An attempt to remedy this problem was to increase sintering time, on the theory that a residual calcium aluminate phase was responsible for the observed low resistivity and that this phase, being highly volatile, could easily be removed from the system. Low resistance dense parts were then re-sintered at 1625° C. for 24 hrs. The results of this test showed that the resistivity of blanks did indeed increase significantly with this heat treatment accompanied with elimination of the initial very small concentration of calcium aluminate present in these samples. However, the resistance of ceramic layers that were trapped between dense metal layers in the co-fired metal ceramic laminate packages were not improved by this treatment. In addition to sintering and further heat treating at 1625° C. (the sintering temperature), a series of low temperature dewetting treatments at 1500° C. of low resistivity samples was performed. As demonstrated in Table II, this treatment was very effective in increasing the resistivity of low resistivity blanks and metallized co-fired packages.

TABLE II

| Ex. No. | Initial Sinter/Dewetting °C./Hour (h) | Initial Resistance (Ω) | Dewetting Treatment (post sinter) °C./h | Resistance (Ω) | Final Microstructure |
|---|---|---|---|---|---|
| 25 | 1625/25 h | $11.5 \times 10^3$ | 1500/10 h | $6.5 \times 10^9$ | |
| 26 | 1625/24 h | $2.29 \times 10^3$ | 1500/4 h | 233 | |
| 27 | 1625/24 h | $3.72 \times 10^3$ | 1500/17 h | $2 \times 10^{10}$ | dewetted |
| 28 | 1625/24 h | $3.3 \times 10^3$ | 1625/24 h | $3.8 \times 10^3$ | wetted |
| 29 | 1625/24 h | $8.1 \times 10^3$ | 1800/4 h | 1.6 | wetted |
| 30 | 1625/24 h | 1.6 | 1500/10 h | $1.4 \times 10^{10}$ | dewetted |
| 31 | 1625/24 h + 1500/17 h* | | | $1.77 \; 10^6$ | wetted |
| 32 | 1625/24 h + 1200/0 h + 1500/10 h | | | $1.14 \times 10^{15}$ | dewetted |
| 33 | 1625/24 h + 1500 17/h | $1.77 \times 10^6$ | 1500/10 h | $2 \times 10^6$ | dewetted |

*Did not cool between sintering and 1500° C. treatment.

Based on this testing, it was observed that sintering at 1625° C., or sintering followed by further heat treating at the sintering temperature of 1625° to 1800° C. is not effective in increasing resistivity of co-fired metal-ceramic laminate packages, particularly between dense metallization layers. Heat treating cooled, dense, low resistivity parts at 1500° C. for a period of time was very effective in increasing resistivity of the co-fired metal-ceramic laminate packages. Upon heat treating a dense co-fired metal-ceramic laminate package at 1500° C., a microstructural transition from a wetted second phase to a de-wetted second phase was observed. Simply following a sintering temperature hold (1625° C.) with a 1500° C. hold was not effective in producing high resistivity parts. If a low temperature (1200° C.) excursion was inserted between the 1625° C. sinter and 1500° C. hold, very high resistivity parts were produced. Wetted second phases (particularly calcium aluminates in addition to the group II containing quaternary compound or boron-substituted quaternary compound) were always observed to be present in low resistivity ceramic. De-wetted second phases were observed to be present in high resistivity ceramic. These samples also have very low dielectric loss at 1 KHz of less than about $10^{-2}$. We have therefore found that in order to produce a high resistivity aluminum ceramic having high density and high thermal conductivity, a dewetted second phase morphology is required.

We propose, while not being limited in the scope of the present invention to the theory, that the de-wetting transition of the second phase occurs because the oxide liquid second phase "sees" an oxygen depleted aluminum nitride grain surface and thus minimizes energy by decreasing the oxide/nitride interfacial area.

This de-wetted microstructure can increase ceramic resistivity for two distinct reasons. The lack of continuity of the second phase will clearly decrease conductivity; and, the chemistry changes which drive the dewetting transition (as well as subsequent chemistry changes) may decrease the conductivity of the isolated second phase regions. We have observed that the dielectric losses are very low in dewetted samples, which would indicate that the second phase particles are not only isolated, but also electrically insulating.

Two samples, described below, were studied to analyze this phenomenon.

Example F

A blank ceramic substrate was prepared from AlN powder, with sintering additives as described in Example E (CAB glass and yttria-based additives) and 0.25% alumina, by sintered at 1625° C. for 10 hours following binder burnout. This sample was tested in examples 35–38 in Table III.

Example G

A co-fired multilayer ceramic-metal laminate having 20 layers of ceramic and buried lines of tungsten metal was prepared, with the ceramic having the formulation and processing as set forth in example F. This sample was tested in examples 39–42 in Table III.

A section from the center of each sample was extracted by diamond scribe/breaking and measured before and after heat treatment. Measurements were made of the electrical resistivity, the second phase composition by X-ray diffraction (XRD) confirmed by energy dispersive X-ray spectroscopy (EDS), and the quaternary second-phase dihedral angle from a scanning electron micrograph (SEM) microstructure. The electrical resistivity was measured by applying silver electrodes to opposite sides of the sample and then measuring the electrical resistance between these electrodes. The resistivity was then calculated from electrode size and sample thickness. A summary of the results of the measurements is contained in Table III.

TABLE III

| EXAMPLE | SINTER/ DEWETTING CYCLE °C./hour (h) | ELECTRICAL RESISTIVITY (Ω-cm @ 100V) | XRD-SECOND PHASES (approximate) percentages) | EDS SECOND PHASES | MICROSTRUCTURE: DIHEDRAL ANGLE |
|---|---|---|---|---|---|
| 35 | 1625/10 h | $2.7 \times 10^5$ | YAP (91%) T (9%) | YAP + T | 15.1 (±6.0) |
| 36 | 1625/10 h 1500/10 h | $1.7 \times 10^{15}$ | YAP (86%) T (14%) | YAP + T | 91.3 (±17.9) |
| 37 | 1625/10 h 1500/10 h 1625/4 h | $1.0 \times 10^6$ | YAP (92%) t (8%) | YAP + T | 14.3 (±6.0) |
| 38 | 1625/10 h 1500/10 h 1625/4 h | $>1.0 \times 10^{16}$ | YAP (86%) T (14%) | YAP + T | 69.9 (±16.4) |

TABLE III-continued

| EXAMPLE | SINTER/ DEWETTING CYCLE °C./hour (h) | ELECTRICAL RESISTIVITY (Ω-cm @ 100V) | XRD-SECOND PHASES (approximate) percentages) | EDS SECOND PHASES | MICROSTRUCTURE: DIHEDRAL ANGLE |
|---|---|---|---|---|---|
| 39 | 1500/10 h 1625/10 h | $5.6 \times 10^4$ | YAP (84%) T (16%) | YAP + T | 12.8 (±5.8) |
| 40 | 1625/10 h | $4.3 \times 10^{13}$ | YAP (75%) T (25%) | YAP + T | 90.2 (±11.8) |
| 41 | 1500/10 h 1625/10 h 1500/10 h | $8.0 \times 10^6$ | YAP (85%) T (11%) YAM (5%) | YAP + T + YAM | 7.3 (±2.6) |
| 42 | 1625/4 h 1625/10 h 1500/10 h 1625/4 h 1500/10 h | $>1.0 \times 10^{16}$ | YAP (89%) T (11%) | YAP + T | 101.0 (±17.4) |

Figure 3:
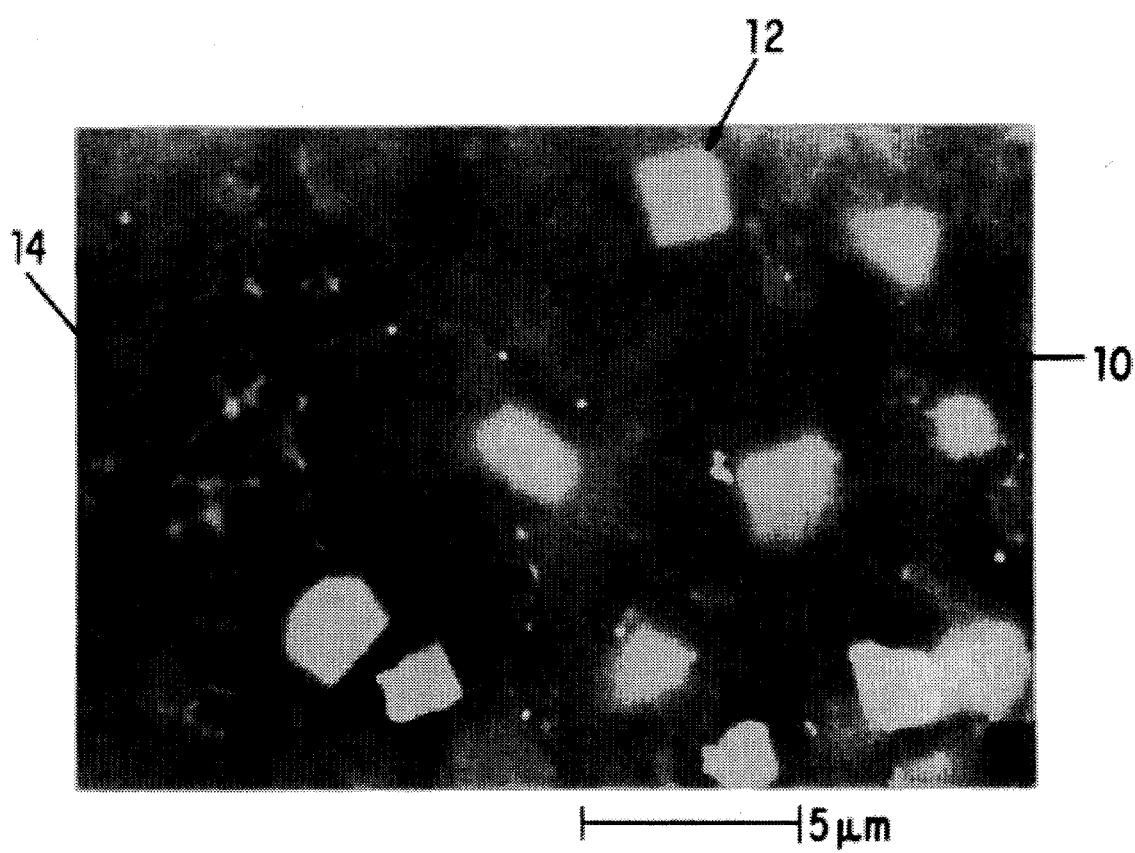
FIG. 3 is a SEM micrograph of the as-sintered microstructure of a blank ceramic substrate prepared without a dewetting treatment.
Figure 6:
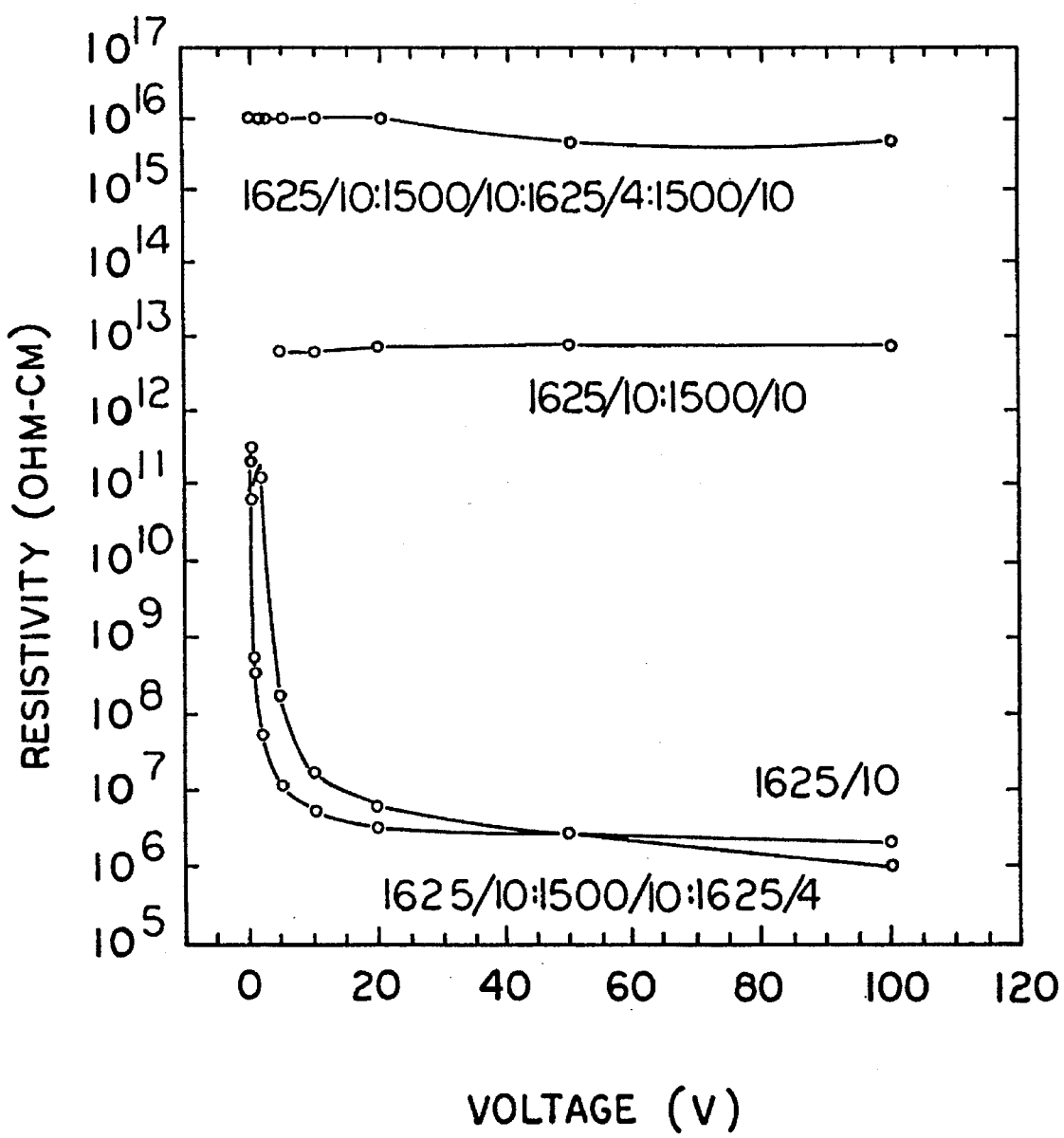
FIG. 6 is a graphical representation of electrical resistivity plotted versus voltage for sample having the dewetting heat treatments as shown in FIG. 5.

XRD = X-Ray Diffraction
EDS = Energy Dispersive X-Ray Spectroscopy
YAP = $YAlO_3$
YAM = $Y_4Al_2O_9$
T = $YCaAl_3O_7$ The as-sintered microstructure of the Example F blank is shown in the SEM micrograph of FIG. 6. Present in this micrograph are three phases. These have been identified by XRD and confirmed with EDS as being AlN (light gray major phase), identified by the numeral 10 in FIG. 3, $YAlO_3$ or YAP (brightest secondary phase), identified by the numeral 12, and $CaYAl_3O_7$ quaternary-phase (less bright secondary phase), identified by the numeral 14. The observations made from this micrograph were that the quaternary-phase had a wetted morphology, the YAP phase was substantially de-wetted, and no phase other than AlN, YAP, and the quaternary was apparent in the microstructure.

Table III shows that the resistivity of the blank sample, example 35, is $2.7 \times 10^5$ Ω-cm, an unacceptably low value. The co-fired laminate sample, example 39, exhibited exactly the same features, and a low resistivity $5.6 \times 10^4$ Ω-cm.

AlN is a known insulator with a band gap energy of 6.3 eV. Studies have shown there is no known impurity which will make this material conductive or semiconductive at room temperature. For macroscopic electrical conductivity across samples such as those observed, (thickness less than 2 mm) the conducting phase must be physically interconnected. Given the microstructural analysis summarized above, there are only two interconnected phases in this system—the AlN and the quaternary-phase. The YAP phase was highly dewetted and cannot be interconnected over such distances. Since the AlN is insulating it must be deduced that the conducting phase was quaternary-phase.

With the assumption that the quaternary second-phase was conductive and interconnected, there are two methods which would effect an increase in the macroscopic electrical resistivity of the sample containing this phase. The first is the removal of the phase from the system by evaporation in a reactive atmosphere. This approach would i) result in an inhomogeneous microstructure with large deposits of second phase near and on the surface and ii) will not work for ceramic regions located between dense metal planes in a package. This is a critical shortcoming, because most commercial electronic packages contain dense power and ground planes.

The second method is based on microstructural control of the secondary phases. We have discovered that by proper heat treatment one can control the morphology of the secondary phases in this system. This type of microstructural control in AlN for any sintering additives is heretofore unknown. The most appropriate measure of this control is the dihedral angle of the secondary phase with respect to the major AlN phase. The dihedral angle is a measure of the degree to which grain boundaries in the AlN ceramic are penetrated by secondary phases. This is also commonly referred to as "extent of wetting" of the secondary phases.

The dihedral angle is formed where a solid-solid grain boundary intersects the liquid, such as the microstructure of polycrystalline grain-to-grain contacts in the liquid phase, as exists during the sintering of polycrystalline aluminum nitride grains in contact with a sintering phase liquid. The "dihedral angle" is the angle formed between the lines formed from a point at the triple point (two grains and the liquid, or second, phase) that subtends the liquid or second phase, that is the lines touch the second phase. The dihedral angle is characteristic of the energy ratio between the grain boundaries and solid-liquid surfaces. If the solid-solid to liquid-solid energy ratio is high, the dihedral angle is small and the liquid will penetrate the grain boundaries of the solid. When the energy ratio is small, then the dihedral angle is high and there is little or no liquid penetration of the solid grain boundaries.

In one extreme, when the second phase fully "wets" the AlN, all the grain boundaries are entirely penetrated by the second phase leading to a microstructure with large narrow channels of second phase along grain boundaries. This microstructure has a fully interconnected second phase over the entire sample. In the other extreme, when the second phase has fully "de-wetted" the AlN, all the grain boundaries are devoid of second phase, the second phase forms into spheres and is entirely disconnected over any distance greater than approximately a grain diameter.

Figure 4A:
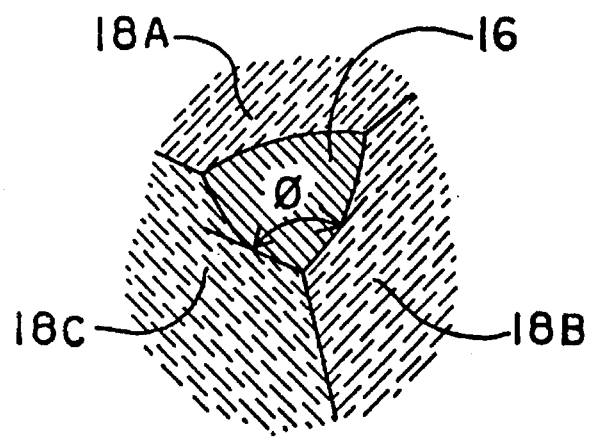
FIG. 4a is a schematic representation a portion of a microstructure (3 grains) which has been penetrated or "wetted" by the second phase to provide a dihedral angle.
Figure 4B:
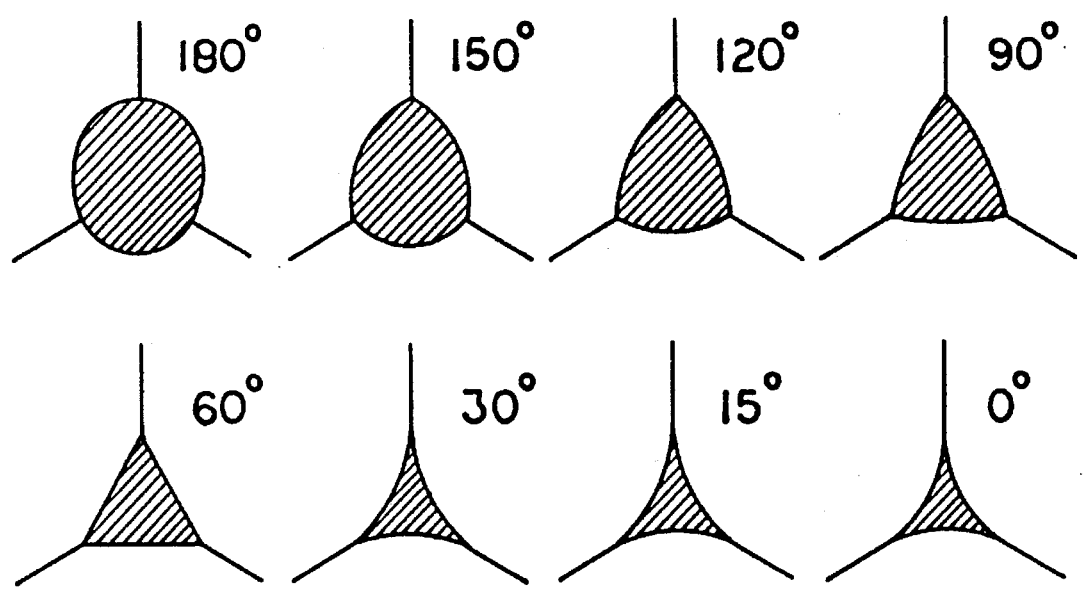
FIG. 4b is a schematic representation a selection of resulting second phase morphologies showing the effect of dihedral angle on shape of second phase formed at a line of intersection between three grains.

In the first extreme (fully wetting) the dihedral angle is defined as being 0° and in the second extreme (full dewetting) the dihedral angle is defined as being 180°. Dihedral angles between 0° and 180° can occur and will result in a continuous distribution of microstructure from fully wetted to fully de-wetted. FIG. 4a presents a schematic drawing of the definition of the dihedral angle (∅). In FIG. 4a, a second phase 16 is shown as having penetrated the grain boundaries of three grains 18a, 18b, and 18c. FIG. 4b is schematic drawing of a selection of resulting second phase morphologies for different values of dihedral angle which shows the effect on the shape of the second phase. It is clear that the extent of interconnectivity of the secondary phase is well characterized by the dihedral angle.

We have discovered that with proper heat treatment, the dihedral angle of some critical secondary phases in AlN, namely calcium aluminates and calcium containing quaternary (and psuedo-quaternary) compounds, can be controlled—i.e. the interconnectivity of the potentially conductive second-phase can be controlled. If this phase is disconnected from the AlN grains, it cannot lead to substantial electrical conductivity over a macroscopic distance. Table III demonstrates the control of the dihedral angle of the quaternary second-phase and the resultant electrical resistivity of the sample utilizing the appropriate heat treatment. In examples 37 and 41, heat treatment below the sintering temperature caused the second phase to dewet from the AlN, resulting in an increase in both dihedral angle and resistivity. Further treatment at sintering temperatures, in examples 37 and 40 resulted in a decrease in both dihedral angle and resistivity. The dihedral angle was increased and high resistivity restored by further treatment of the samples at an elevated temperature below the sintering temperature.

It is important to note that the second phase composition in these samples were not changing to any significant degree. Structurally, all that changed was the dihedral angle of the quaternary (or pseudo-quaternary) second-phase.

Figure 5:
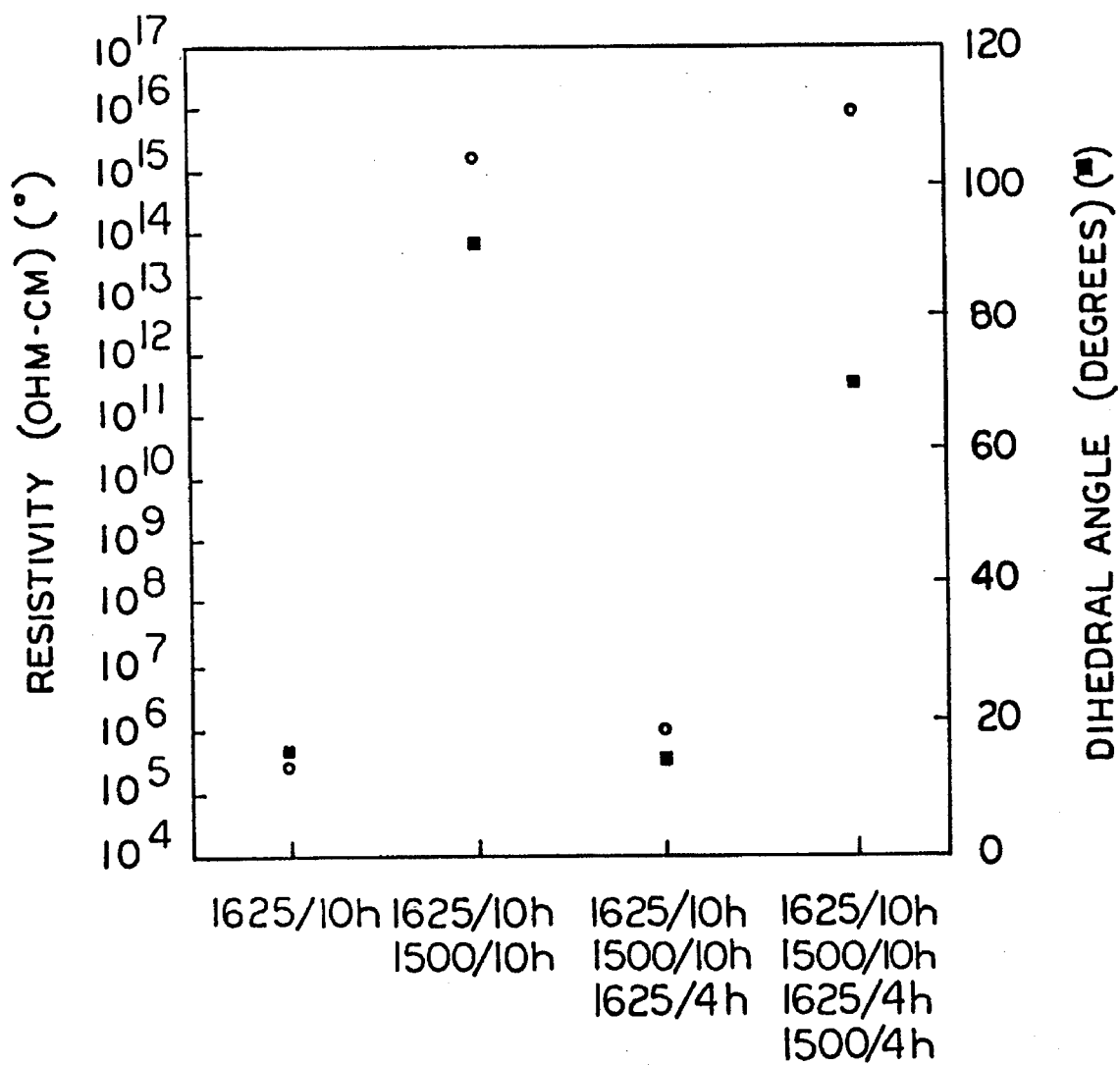
FIG. 5 is a graphical representation of electrical resistivity and dihedral angle plotted versus heat treatment of samples prepared according to the present invention.

FIG. 5 presents a plot of electrical resistivity and dihedral angle of the quaternary second-phase as a function of heat treatment for the same sample. A very large change in electrical resistivity, greater than 10 orders of magnitude, accompanied a corresponding change in the dihedral angle of the quaternary second-phase. In the as-sintered condition (1625° C./10 h) the sample is conductive with a low quaternary second-phase dihedral angle (wetting). A heat treatment of the same sample at 1500° C./10 h gives a material with a very high resistivity (nonconductive) and a large quaternary second-phase dihedral angle (dewetting). A further "sintering" heat treatment of the same sample at 1625° C./4 h re-wets the quaternary second-phase and the resistivity drops again to a low value similar to that in the as-sintered condition. An additional dewetting heat treatment at 1500° C./10 h once again dewets the quaternary second-phase with a concomitant increase in the electrical resistivity. Such reversibility of the electrical resistivity linked to the dihedral angle of the quaternary second-phase establishes a direct correspondence between these two properties.

The results above demonstrate the drastic effect that the microstructure of sintered AlN, having a calcium-containing quaternary second-phase, has on electrical resistivity, a key property for electronic packaging applications. The effect of second phase microstructure can also be observed in a number of other important electrical properties such as the dielectric properties.

Figure 7:
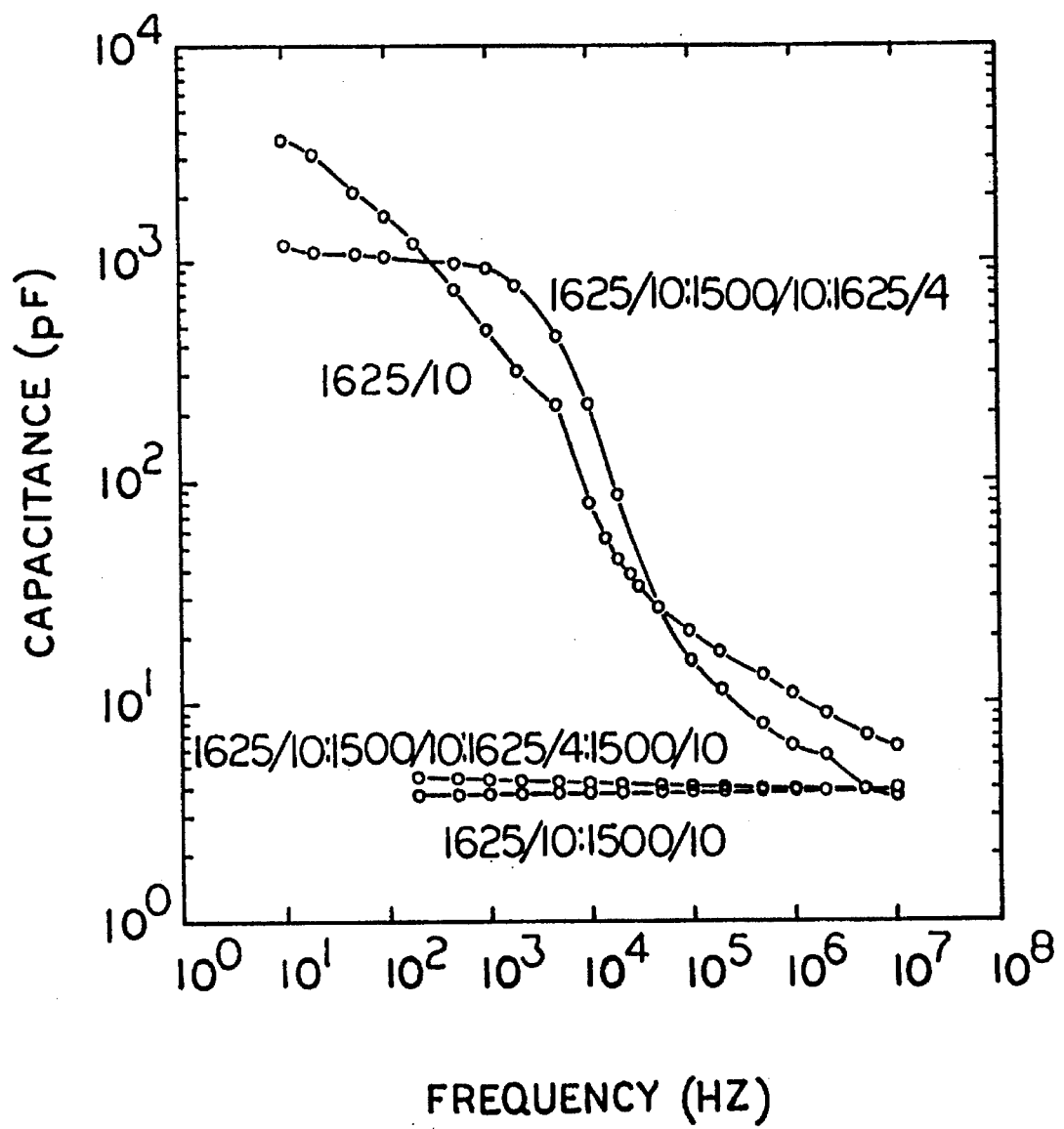
FIG. 7 is a graphical representation of capacitance (pF) versus frequency (Hz) of the samples having the dewetting heat treatments as shown in FIG. 5.
Figure 8:
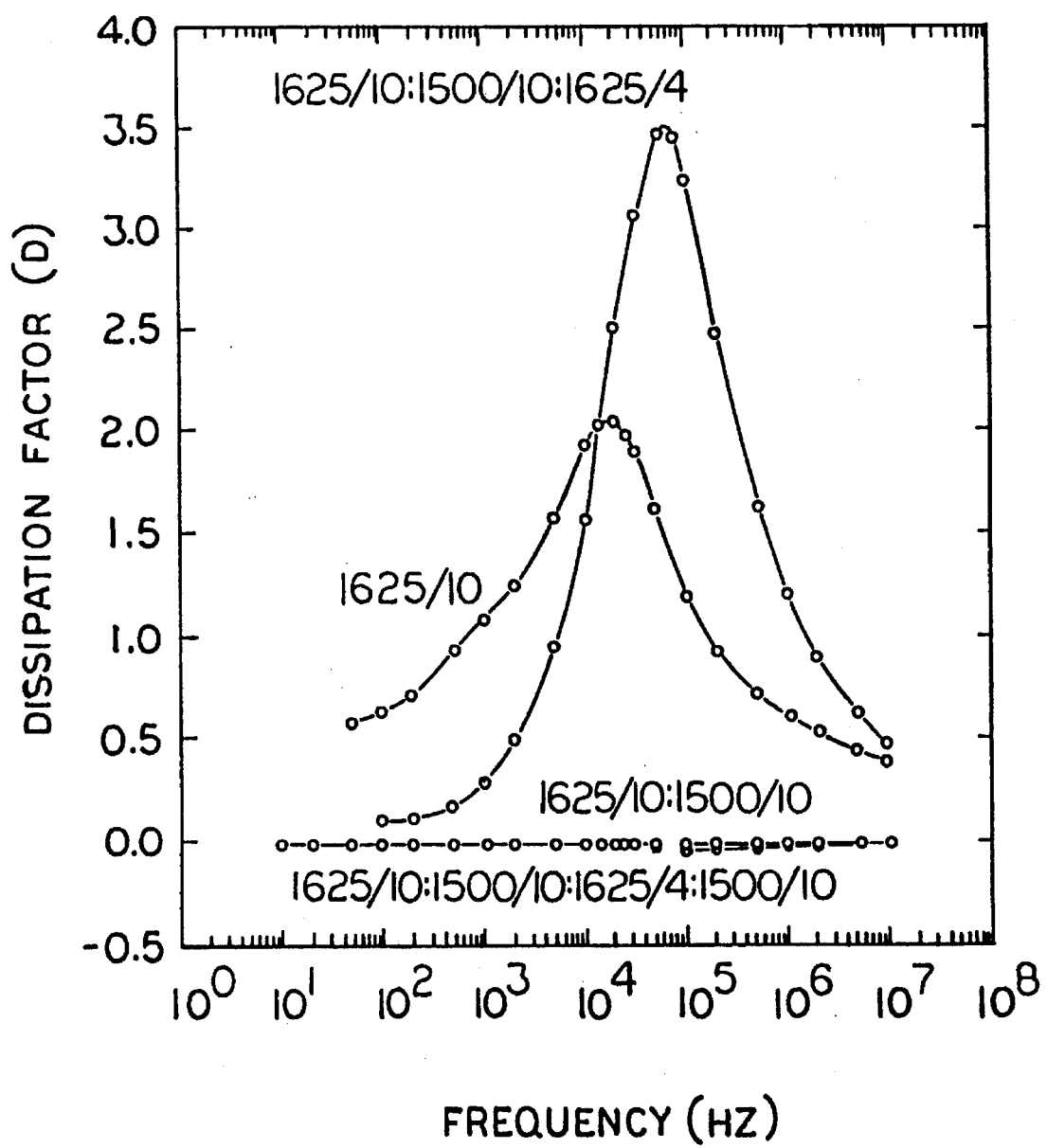
FIG. 8 is a graphical representation of dissipation factor (D) versus frequency (Hz) of the samples having the dewetting heat treatments as shown in FIG. 5.

Measurements of the electrical resistivity as a function of voltage and dewetting heat treatment, and therefore dihedral angle, is presented in FIG. 6. It is readily apparent that AlN ceramic resistivity is highly dependent on the AlN—second phase microstructure, as has been demonstrated above. FIG. 7 presents the capacitance (in pF), and FIG. 8 presents the dissipation factor (D) of the examples 35–38 as a function of frequency and heat treatment (dihedral angle). Once again it is clear that these other key electrical properties are controlled by the second-phase wetting angle. This is particularly exemplified in the dissipation factor data, where a large peak is present when the second-phase is wetted and then totally disappears when the second-phase is dewetted. This data is a reliable "signature" of state of the microstructure of the sample. This, in combination with the resistivity results are a clear demonstration that the calcium containing second phase compound wetting angle in AlN ceramics controls key electrical properties.

Figure 4C:
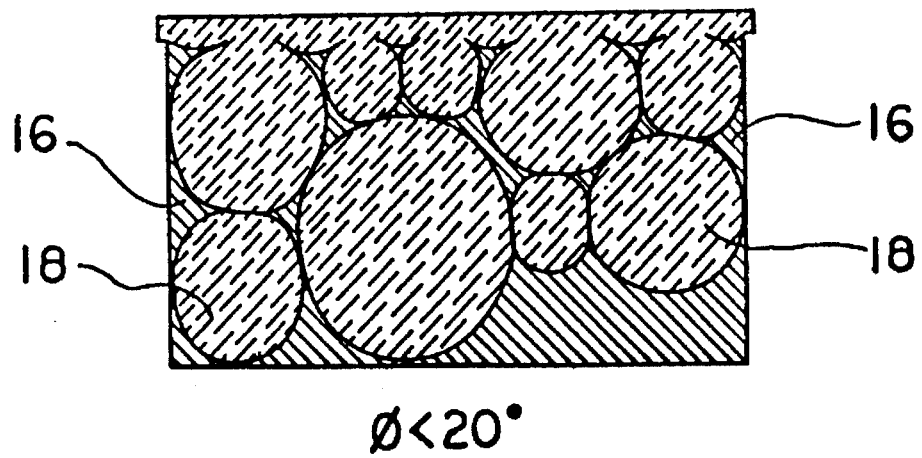
FIG. 4c is a schematic representation of a cross-sectional view of a wetted ceramic microstructure having a dihedral angle of about 20° or less.
Figure 4D:
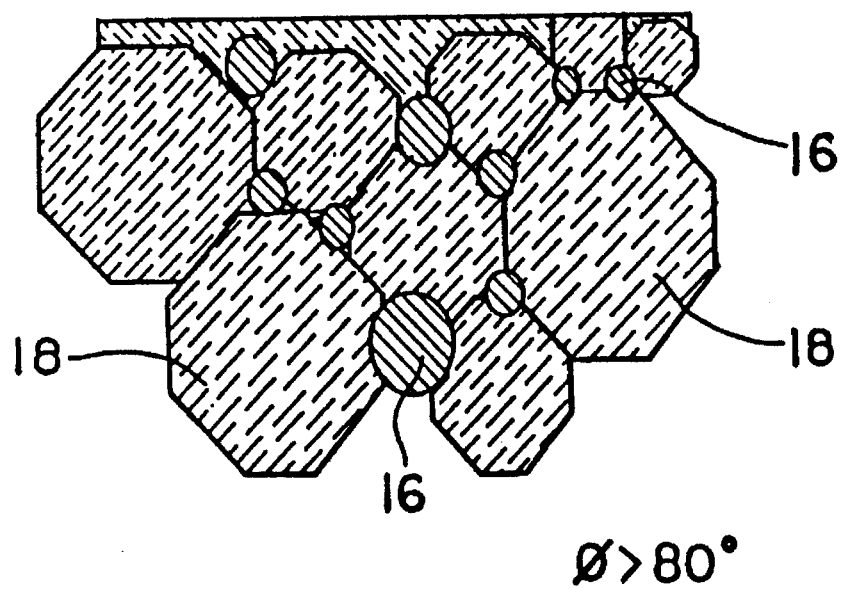
FIG. 4d is a schematic representation of a cross-sectional view of a dewetted ceramic microstructure having a dihedral angle of about 80° or more.

In the present invention, it is recognized that although the potentially conductive calcium aluminate and quaternary second phase species may be volatilized by high temperature treatment for an effective period of time for removal from a monolithic aluminum nitride ceramic substrate, in a co-fired metal-ceramic laminate structure, dense metal planes sinter very early in the sintering process, and the calcium aluminate species cannot vaporize through them. The present invention provides for the restoration of high resistivity of the ceramic having a potentially conductive second phase by causing the second phase to de-wet from the ceramic aluminum nitride grains, that is, to transition from a wetted microstructure having a dihedral angle insufficient to provide an electrical resistivity suitable for electronic packaging applications, i.e., of about 20° or less as shown schematically in FIG. 4c, to a de-wetted microstructure having a dihedral angle sufficient to provide an electrical resistivity of at least about $10^8$ Ω-cm or more, which is believed to be an angle of about 30° or more, preferably about 80° or more, as shown schematically in FIG. 4d.

Thus, a presintering aluminum nitride powder/sintering aid mixture according to the present invention results in a highly resistive, low temperature sintered aluminum nitride ceramic body having a microstructure containing aluminum nitride grains and a calcia-containing second phase, the second phase being at least partially dewetted and in contact with the aluminum nitride grains at a dihedral angle of greater than about 30°, preferably greater than or equal to about 80°. In such a highly resistive, sintered aluminum nitride ceramic body, the second phase has a substantially dewetted microstructure.

EXAMPLE H

Figure 9:
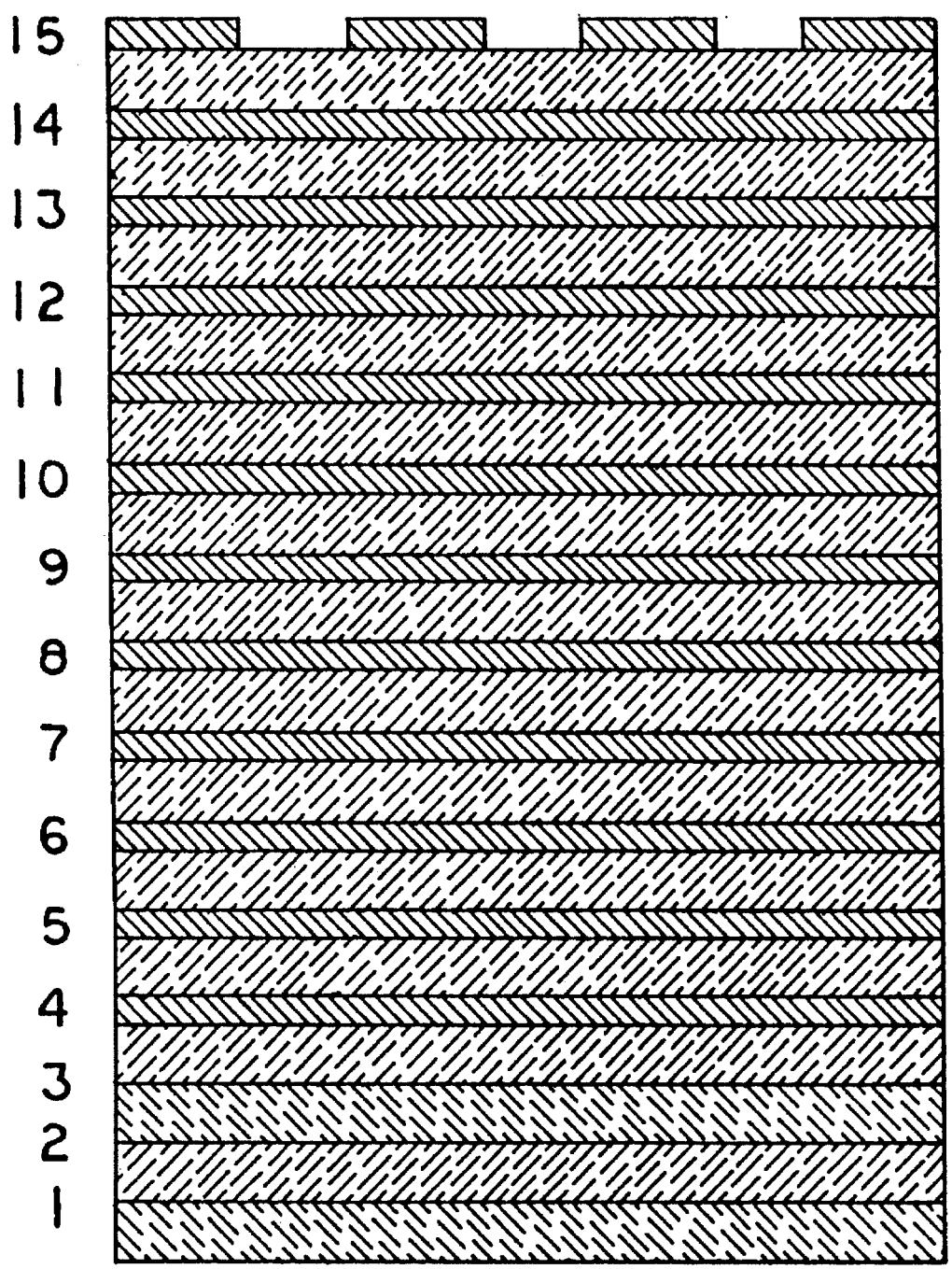
FIG. 9 is a schematic cross sectional view of an AlN ceramic-tungsten metal laminate electronic substrate prepared according to the present invention.

Aluminum nitride ceramic—tungsten metal laminate electronic substrates were prepared according to the configuration shown in FIG. 9, comprising fifteen ceramic layers and nine metal layers as described in Table IV.

TABLE IV

| Layer | Layer Characteristic |
|---|---|
| 1 | Blank |
| 2 | Blank |
| 3 | Blank |
| 4 | Vias + Redistribution |
| 5 | Vias + Redistribution |
| 6 | Vias + Metal Plane (Power) |
| 7 | Vias + Metal Plane (Ground) |
| 8 | Vias |
| 9 | Vias + Redistribution |
| 10 | Vias + Redistribution |
| 11 | Vias + Metal Plane (Ground) |
| 12 | Vias + Redistribution |
| 13 | Vias + Redistribution |
| 14 | Vias |
| 15 | I/O Pads |

The ceramic was prepared from a presintering mixture of aluminum nitride powder, 3 weight % yttria powder and 1 weight percent powdered calcia-alumina-boria (CAB) glass (50/40/10 weight % ratio), which was tape cast, blanked, printed with metallization and laminated to produce multilayer, laminated ceramic—metal parts.

After binder burnout at 1300° C. for 4 hours, the parts were processed as set forth in Table V below.

The final sintered parts contained 3-dimensional interconnected tungsten metal lines called "nets". The most important of these connect two dense metal layers (6 and 7) which prevent second phase evolution during the sintering cycle.

The resistance of the "net" area of the ceramic was measured, and the second phase present was identified as $Ca_{12}Al_7O_x$ by X-ray diffraction. In some examples, the dihedral angle of the second phase to the polycrystalline grains was measured. These are reported in Table V below.

the microstructure is accompanied by a dramatic rise in the resistivity of ceramic having second phase compositions including calcium aluminate and/or calcium containing quaternary and pseudo-quaternary second phase species. Pref-

TABLE V

| Example | Sintering/Dewetting Cycle | Resistance of Metal Net (Ω) | Second Phase Composition | Dihedral Angle (degrees) |
|---|---|---|---|---|
| 43 | 1625° C./24 h<br>1200° C./0 h<br>1450° C./4 h | $1.0 \times 10^{12}$ | T, YAP | |
| 44 | 1625° C./24 h<br>1500° C./17 h | $1.77 \times 10^6$ | T, YAG, $C_{12}A_7$, YAP | 39 |
| 45 | 1500° C./10 h treatment of Example 111 | $2.0 \times 10^{14}$ | T YAGB, $C_{12}A_7$, YAP | 80 |
| 46 | 1625° C./10 h treatment of Example 112 | $8.5 \times 10^3$ | T, YAG, $C_{12}A_7$, YAP | 27 |
| 47 | 1500° C./10 h treatment of Example 113 | $1.0 \times 10^{12}$ | T, YAG, $C_{12}A_7$, YAP | 81 |
| 48 | 1625° C./24 h | $3.72\ 10^3$ | T, YAG, $C_{12}A_7$, YAP | |
| 49 | 1625° C./24 h | $8.1 \times 10^3$ | YAG, $C_{12}A_7$, T | |
| 50 | 1800° C./4 h | 1.6 | YAG, $C_{12}A_7$ | |

$C_{12}A_7 = Ca_{12}Al_{14}O_x$
$T = YCaAl_3O_7$
$YAG = Y_3Al_5O_{12}$
$YAP = YAlO_3$

In example 43, a highly resistive multilayer ceramic-metal laminate containing the presintering mixture of the present invention was subjected to a single step sintering cycle, including a cooling to 1200° C. prior to a dewetting heat treatment step below the sintering temperature. The net was highly resistive.

In example 44, there was a 1500° C. hold after sintering. Resistivity was moderate, as the dihedral angle was measured at 39°. In example 45, parts from example 44 were subjected to a 1500° C. dewetting treatment after cooling. Resistivity was increased to above $10^{14}$ Ω-cm, as was the dihedral angle, to 80°.

The connectivity of the second phase as shown by the dihedral angle is controlled by the heat treatments without a significant change in the second phase composition. The microstructure was shown to be reversible by the dewetting heat treatment in example 46 of parts from example 45 at the sintering temperature. The second phase again became wetting, and the resistivity dropped dramatically, to below $10^4$ Ω-cm, as the dihedral angle decreased to 27°. The second phase was again dewetted by the heat treatment of parts from example 46 in example 47, at a temperature below the sintering temperature. The resistivity recovered, to about $10^{12}$ Ω-cm and the dihedral angle increased to 81°.

Figure 10:
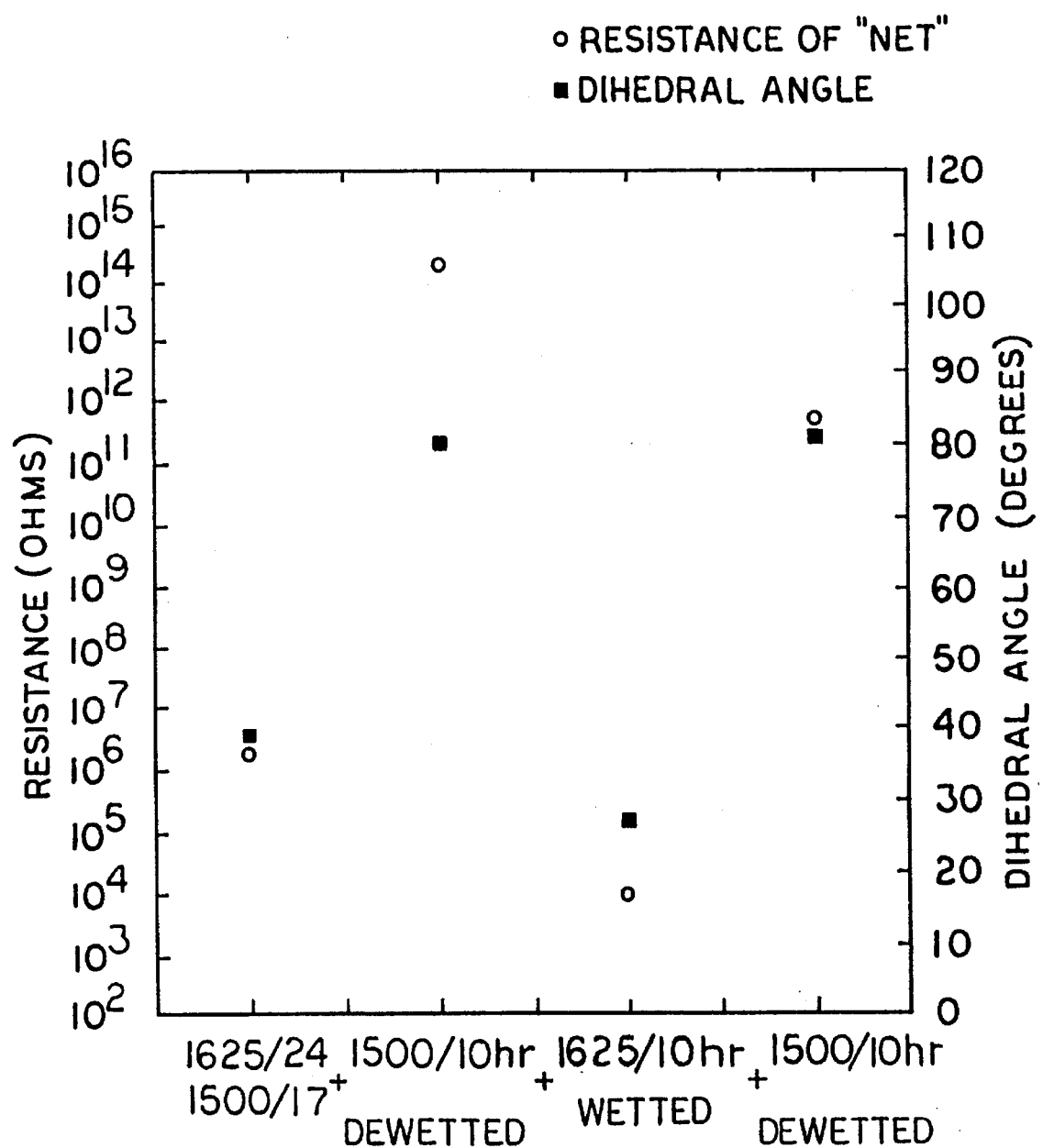
FIG. 10 is a graphical representation of electrical resistivity and dihedral angle plotted versus heat treatment of samples prepared according to the present invention.

The resistivity and dihedral angle are charted for these examples in FIG. 10, to show the relationship between resistivity of the ceramic-metal net and the dihedral angle (microstructure) of the second phase.

In comparative examples 48, 49, and 50, the parts were sintered after the binder burnout step, without a subsequent heat treatment. The resistivity of the net was very low for these parts. Microstructural analysis and elemental mapping by X-ray spectroscopy showed a highly wetted microstructure, having a dihedral angle less than 30°, with interconnected areas of $Ca_{12}Al_7O_x$ throughout the material.

It is thus demonstrated that the microstructure of the second phase material can be dramatically affected by post sintering heat treatments, and that heat treatments below the sintering temperature can cause dewetting of the second phase from the aluminum nitride grains. The dewetting of erably, such a ceramic has a resistivity of greater than $10^8$ Ω-cm.

We have found that the heat treatment of the present invention is unexpectedly effective in refining the microstructure of the second phase and changing electrical resistivity, even at temperatures which are below those at which second phase liquid was thought to exist, and below temperatures at which sintering occurs.

Thus, the objects of the invention are accomplished by the present invention, which is not limited to the specific embodiments described above, but which includes variations, modifications and equivalent embodiments defined by the following claims.

We claim:

1. A resistive sintered aluminum nitride ceramic body, prepared from a presintering aluminum nitride powder/sintering aid mixture wherein the aluminum nitride contains alumina and wherein the sintering aid comprises a) an element or compound of a metal selected from the group consisting of Group IIa, IIIa, lanthanide metals and mixtures thereof, and b) a glassy component formed from alumina, calcia, and boria, said metal element or compound being reactible with the glassy component and the alumina from the AlN to form a second phase containing a calcium containing component upon sintering, said calcium containing component of said second phase being in contact with aluminum nitride at a dihedral angle sufficient to provide a resistivity of at least about $10^8$ Ω-cm upon heat treatment.

2. The resistive, sintered aluminum nitride ceramic body of claim 1 wherein said dihedral angle is greater than 30°.

3. The resistive, sintered aluminum nitride ceramic body of claim 1 wherein said dihedral angle is greater than or equal to about 80°.

4. The resistive sintered aluminum nitride ceramic body of claim 1 wherein said second phase has a substantially dewetted microstructure.

5. The resistive, sintered aluminum nitride ceramic body of claim 1 wherein said second phase contains a quaternary or pseudo-quaternary compound containing Ca, Y, Al, and O and having substitutional boron contained within said compound.

6. The resistive, Sintered aluminum nitride ceramic body of claim 1 wherein said second phase includes $CaYAl_3O_7$ having substitutional boron.

7. The resistive, sintered aluminum nitride ceramic body of claim 1 wherein said second phase includes $CaYAlO_4$ having substitutional boron.

8. A resistive sintered aluminum nitride ceramic body prepared from a presintering aluminum nitride powder/sintering aid mixture wherein the aluminum nitride contains alumina and the sintering aid comprises a) an element or compound of a metal selected from the group consisting of Group IIa, IIIa, lanthanide metals and mixtures thereof, and b) a glassy component formed from alumina, calcia, and boria, wherein the presintering mixture is sintered, at a sintering temperature between 1550° C. and 1800° C., to form a sintered body having a second phase containing a calcium containing component; said sintered body being cooled to at least below 1500° C.; and heat treated at a temperature of at least 1300° C. but below the sintering temperature for a period of time sufficient to cause said calcium containing component of said second phase to at least partially dewet from the aluminum nitride so as to contact the aluminum nitride at a dihedral angle sufficient to provide a resistivity of at least $10^8$ $\Omega$-cm.

9. The resistive, sintered aluminum nitride ceramic body of claim 8 wherein said dihedral angle is greater than 30°.

10. The resistive, sintered aluminum nitride ceramic body of claim 8 wherein said dihedral angle is greater than or equal to about 80°.

11. The resistive, sintered aluminum nitride ceramic body of claim 8 wherein said second phase has a substantially dewetted microstructure.

12. The resistive, sintered aluminum nitride ceramic body of claim 8 wherein said second phase contains a quaternary or pseudo-quaternary compound containing Ca, Y, Al, and O and having substitutional boron contained within said compound.

13. The resistive, sintered aluminum nitride ceramic body of claim 8 wherein said second phase includes $CaYAl_3O_7$ having substitutional boron.

14. The resistive, sintered aluminum nitride ceramic body of claim 8 wherein said second phase includes $CayAlO_4$ having substitutional boron.

15. A resistive, sintered aluminum nitride ceramic body formed from a presintering aluminum nitride powder/sintering aid mixture wherein the aluminum nitride contains alumina and wherein the sintering aid comprises a glassy component formed from a) an oxide of at least one metal selected from the group consisting of Group IIia, lanthanide metals and mixtures thereof, and b) alumina, calcia, and boria, said glassy component being reactable with the alumina from the AlN to form a second phase containing a calcium containing component upon sintering, said calcium containing component of second phase being in contact with aluminum nitride at a dihedral angle sufficient to provide a resistivity of at least about $10^8$ $\Omega$-cm upon heat treatment.

16. The resistive, sintered aluminum nitride ceramic body of claim 15 wherein said dihedral angle is greater than 30°.

17. The resistive, sintered aluminum nitride ceramic body of claim 15 wherein said dihedral angle is greater than or equal to about 80°.

18. The resistive, sintered aluminum nitride ceramic body of claim 15 wherein said second phase has a substantially dewetted microstructure.

19. The resistive, sintered aluminum nitride ceramic body of claim 15 wherein said second phase contains a quaternary or pseudo-quaternary compound containing Ca, Y, Al, and O and having substitutional boron contained within said compound.

20. The resistive, sintered aluminum nitride ceramic body of claim 15 wherein said second phase includes $CaYAl_3O_7$ having substitutional boron.

21. The resistive, sintered aluminum nitride ceramic body of claim 15 wherein said second phase includes $CayAlO_4$ having substitutional boron.

22. A resistive, sintered aluminum nitride ceramic body prepared from a presintering aluminum nitride powder/sintering aid mixture wherein the aluminum nitride contains alumina and wherein the sintering aid comprises a glassy component formed from a) an oxide of at least one metal selected from the group consisting of Group IIIa, lanthanide metals and mixtures thereof, and b) alumina, calcia, and boria, and wherein the presintering mixture is sintered, at a sintering temperature between 1550° C. and 1800° C., to form a sintered body having a second phase having a calcium containing component; said sintered body being cooled to at least below 1500° C.; and heat treated at a temperature of at least 1300° C. but below the sintering temperature for a period of time sufficient to cause said calcium containing component of said second phase to at least partially dewet from the aluminum nitride so as to contact the aluminum nitride at a dihedral angle sufficient to provide a resistivity of at least $10^8$ $\Omega$-cm.

23. The resistive, sintered aluminum nitride ceramic body of claim 22 wherein said dihedral angle is greater than 30°.

24. The resistive, sintered aluminum nitride ceramic body of claim 22 wherein said dihedral angle is greater than or equal to about 80°.

25. The resistive, sintered aluminum nitride ceramic body of claim 22 wherein said second phase has a substantially dewetted microstructure.

26. The resistive, sintered aluminum nitride ceramic body of claim 22 wherein said second phase contains a pseudo-quaternary compound containing Ca, Y, Al, and O.

27. The resistive, sintered aluminum nitride ceramic body of claim 22 wherein said second phase includes $CaYAl_3O_7$ having substitutional boron.

28. The resistive, sintered aluminum nitride ceramic body of claim 22 wherein said second phase includes $CayAlO_4$ having substitutional boron.

29. A process for producing sintered aluminum nitride bodies comprising preparing a presintered mixture as set forth in claim 1; sintering, in a sintering atmosphere to a sintering temperature between about 1550° C. and 1800° C. to form a sintered body having a second phase containing a calcium containing component; cooling said sintered body to a temperature at least below 1500° C.; and heat treating said sintered body at a temperature of at least 1300° C. but below the sintering temperature for a period of time sufficient to cause said calcium containing component of said second phase to at least partially dewet from the aluminum nitride so as to contact the aluminum nitride at a dihedral angle sufficient to provide a resistivity of at least $10^8$ $\Omega$-cm.

30. A process for producing sintered aluminum nitride bodies comprising preparing a presintered mixture as set forth in claim 15; sintering, in a sintering atmosphere to a sintering temperature between about 1550° C. and 1800° C. to form a sintered body having a second phase containing a calcium containing component; cooling said sintered body to a temperature at least below 1500° C.; and heat treating said sintered body at a temperature of at least 1300° C. but below the sintering temperature for a period of time sufficient to cause said calcium containing component second phase to at least partially dewet from the aluminum nitride so as to contact the aluminum nitride at a dihedral angle sufficient to provide a resistivity of at least $10^8$ Ω-cm.

31. A sintered aluminum nitride body having low camber, high dimensional stability, at least 95% theoretical density and a thermal conductivity of at least 120 W/m-K comprising aluminum nitride and a calcium containing second phase containing a pseudo-quaternary compound containing Ca, Y, Al, and O and having substitutional boron contained within said compound, said second phase being in contact with said aluminum nitride at a dihedral angle sufficient to provide a resistivity of at least about $10^8$ Ω-cm.

32. The sintered aluminum nitride body of claim 31 wherein said dihedral angle is greater than 30°.

33. The sintered aluminum nitride body of claim 31 wherein said dihedral angle is greater than or equal to about 80°.

34. The sintered aluminum nitride body of claim 31 wherein said second phase has a substantially dewetted microstructure.

35. The sintered aluminum nitride body of claim 31 wherein said second phase contains $CaYAl_3O_7$ having substitutional boron.

36. The sintered aluminum nitride body of claim 31 wherein said second phase contains $CaYAlO_4$ having substituted boron.

37. The sintered aluminum nitride body of claim 31 with a dielectric loss at 1 kHz of less than $10^{-2}$.

38. A co-sintered multilayer laminate comprising at least one ceramic layer and at least one metal layer wherein the at least one ceramic layer comprises the sintered aluminum nitride body of claim 31.

39. The co-sintered multilayer laminate of claim 38, wherein said metal comprises at least one of tungsten and molybdenum.

40. The co-sintered multilayer laminate of claim 39, wherein the metal resistivity is less than 3 times the value of the bulk metal.

41. The resistive, sintered aluminum nitride ceramic body of claim 1 wherein said Group IIa metals are selected from the group consisting of Ca, St, Ba and mixtures thereof.

42. The resistive, sintered aluminum nitride ceramic body of claim 1 wherein said Group IIIa and lanthanide metals are selected from the group consisting of Y, La, Ce, Nd, Sm, Eu, Gd, Tb, Dy, Ho, Er, Tm, Yb, Lu, and mixtures thereof.

43. The resistive, sintered aluminum nitride ceramic body of claim 1 wherein the metal element or compound is yttrium or a yttrium compound.

44. The resistive, sintered aluminum nitride ceramic body of claim 43 wherein the yttrium compound is yttria.

45. The resistive, sintered aluminum nitride ceramic body of claim 1 wherein the presintering mixture additionally comprises added alumina as metal oxide.

46. The resistive, sintered aluminum nitride ceramic body of claim 8 wherein said Group IIa metals are selected from the group consisting of Ca, St, Ba and mixtures thereof.

47. The resistive, sintered aluminum nitride ceramic body of claim 8 wherein said Group IIIa and lanthanide metals are selected from the group consisting of Y, La, Ce, Nd, Sin, Eu, Gd, Tb, Dy, Ho, Er, Tm, Yb, Lu, and mixtures thereof.

48. The resistive, sintered aluminum nitride ceramic body of claim 8 wherein the metal element or compound is yttrium or a yttrium compound.

49. The resistive, sintered aluminum nitride ceramic body of claim 48 wherein the yttrium compound is yttria.

50. The resistive, sintered aluminum nitride ceramic body of claim 8 wherein the presintering mixture additionally comprises added alumina as metal oxide.

51. The resistive, sintered aluminum nitride ceramic body of claim 15 wherein said Group IIIa and lanthanide metals are selected from the group consisting of Y, La, Ce, Nd, Sin, Eu, Gd, Tb, Dy, Ho, Er, Tm, Yb, Lu, and mixtures thereof.

52. The resistive, sintered aluminum nitride ceramic body of claim 15 wherein the presintering mixture additionally comprises added alumina as metal oxide.

53. The resistive, sintered aluminum nitride ceramic body of claim 15 wherein the sintering aid contains an additional non-vitreous component comprising at least one element or compound of a metal selected from the group consisting of Group IIa, IIIa, lanthanide metals and mixtures thereof.

54. The resistive, sintered aluminum nitride ceramic body of claim 53 wherein said Group IIa metals are selected from the group consisting of Ca, St, Ba and mixtures thereof, and wherein said Group IIIa and lanthanide metals are selected from the group consisting of Y, La, Ce, Nd, Sm, Eu, Gd, Tb, Dy, Ho, Er, Tin, Yb, Lu, and mixtures thereof.

55. The resistive, sintered aluminum nitride ceramic body of claim 53 wherein the presintering mixture additionally comprises added alumina as metal oxide.

56. The resistive, sintered aluminum nitride ceramic body of claim 22 wherein said Group IIIa and lanthanide metals are selected from the group consisting of Y, La, Ce, Nd, Sin, Eu, Gd, Tb, Dy, Ho, Er, Tin, Yb, Lu, and mixtures thereof.

57. The resistive, sintered aluminum nitride ceramic body of claim 22 wherein the presintering mixture additionally comprises added alumina as metal oxide.

58. The resistive, sintered aluminum nitride ceramic body of claim 22 wherein the sintering aid contains an additional non-vitreous component comprising at least one element or compound of a metal selected from the group consisting of Group IIa, IIIa, lanthanide metals and mixtures thereof.

59. The resistive, sintered aluminum nitride ceramic body of claim 58 wherein said Group IIa metals are selected from the group consisting of Ca, Sr, Ba and mixtures thereof, and wherein said Group IIIa and lanthanide metals are selected from the group consisting of Y, La, Ce, Nd, Sm, Eu, Gd, Tb, Dy, Ho, Er, Tm, Yb, Lu, and mixtures thereof.

60. The resistive, sintered aluminum nitride ceramic body of claim 58 wherein the presintering mixture additionally comprises added alumina as metal oxide.

* * * * *